United States Patent
Kujirai

(10) Patent No.: US 7,142,327 B2
(45) Date of Patent: Nov. 28, 2006

(54) INFORMATION PROCESSING APPARATUS AND PRINT PROCESSING METHOD

(75) Inventor: Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 964 days.

(21) Appl. No.: 09/986,794

(22) Filed: Nov. 13, 2001

(65) Prior Publication Data

US 2002/0067507 A1    Jun. 6, 2002

(30) Foreign Application Priority Data

Nov. 14, 2000  (JP)  ............................. 2000-347023
Dec. 27, 2000  (JP)  ............................. 2000-398976

(51) Int. Cl.
*G06K 1/00*   (2006.01)
*G06F 15/00*  (2006.01)

(52) U.S. Cl. ................... 358/1.18; 358/1.11; 358/1.12; 358/1.15; 358/1.2

(58) Field of Classification Search ................ 358/450, 358/449, 351, 453, 462, 1.2, 1.18, 1.11, 1.12, 358/1.17
See application file for complete search history.

(56) References Cited

U.S. PATENT DOCUMENTS

| | | | | |
|---|---|---|---|---|
| 4,254,409 A | * | 3/1981 | Busby | ........................ 358/1.2 |
| 4,342,052 A | * | 7/1982 | Rackley et al. | ............. 358/450 |
| 5,191,429 A | * | 3/1993 | Rourke | ........................ 358/296 |
| 5,537,518 A | * | 7/1996 | Hasegawa | ................... 358/1.18 |
| 5,745,659 A | * | 4/1998 | Rigau Rigau et al. | ........ 358/1.2 |
| 5,768,488 A | * | 6/1998 | Stone et al. | ................ 358/1.18 |
| 5,838,325 A | * | 11/1998 | Deen et al. | .................. 715/841 |
| 6,313,919 B1 | * | 11/2001 | Nakagiri et al. | ............ 358/1.11 |
| 6,501,562 B1 | * | 12/2002 | Nakagiri et al. | .............. 358/1.2 |
| 6,690,477 B1 | * | 2/2004 | Nakagiri et al. | ............ 358/1.12 |
| 7,061,632 B1 | * | 6/2006 | Livingston | .................. 358/1.15 |

* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

An information processing system which can easily perform a printing process irrespective of a restriction of an output paper size which can be defined by the user, effectively adds a page frame, and can perform the printing process. To accomplish the above object, according to the invention, an information processing apparatus for executing the printing process has: an input device for inputting an arbitrary first output paper size included in a predetermined second output paper size; and a layout device for arranging a plurality of pages of the first output paper size to one page of the second output paper size.

14 Claims, 18 Drawing Sheets

FIG. 8

| JOB ID |
|---|
| PHYSICAL PAGE NO. FOR THIS PAGE |
| NO. OF LOGICAL PAGES(N) ASSIGNED TO 1 PHYSICAL PAGE |
| FIRST LOGICAL PAGE NO. |
| : |
| N-TH LOGICAL PAGE NO. |
| NO. OF PAGES FOR 1 COPY OF THIS JOB |

FIG. 18A 4-UP/9-UP/16-UP FOR PORTRAIT

| PRINT ORDER/ BINDING DIRECTION | SHORT EDGE | LONG EDGE |
|---|---|---|
| LRTB | LRBT | RLTB |
| RLTB | RLBT | LRTB |
| TBLR | BTLR | TBRL |
| TBRL | BTRL | TBLR |

FIG. 18B 4-UP/9-UP/16-UP FOR LANDSCAPE

| PRINT ORDER/ BINDING DIRECTION | SHORT EDGE | LONG EDGE |
|---|---|---|
| LRTB | RLTB | LRBT |
| RLTB | LRTB | RLBT |
| TBLR | TBRL | BTLR |
| TBRL | TBLR | BTRL |

FIG. 18C 2-UP

| PRINT ORDER/ BINDING DIRECTION | SHORT EDGE | LONG EDGE |
|---|---|---|
| LR (PORTRAIT) | RL | LR |
| RL (PORTRAIT) | LR | RL |
| TB (LANDSCAPE) | BT | TB |

FIG. 18D 6-UP/8-UP FOR PORTRAIT

| PRINT ORDER/ BINDING DIRECTION | SHORT EDGE | LONG EDGE |
|---|---|---|
| LRTB | RLTB | LRBT |
| RLTB | LRTB | RLBT |
| TBLR | TBRL | BTLR |
| TBRL | TBLR | BTRL |

FIG. 18E 6-UP/8-UP FOR LANDSCAPE

| PRINT ORDER/ BINDING DIRECTION | SHORT EDGE | LONG EDGE |
|---|---|---|
| LRTB | LRBT | RLTB |
| RLTB | RLBT | LRTB |
| TBLR | BTLR | TBRL |
| TBRL | BTRL | TBLR |

INFORMATION PROCESSING APPARATUS AND PRINT PROCESSING METHOD

BACKGROUND OF THE INVENTION

1. Field of the Invention

The invention relates to an information processing apparatus, an information processing system, and a print processing method which are used in an apparatus or a system for processing print data and printing the print data obtained after the process by a printer in the information processing apparatus on the host side such as a personal computer or the like. The invention also relates to a computer program for allowing a computer to execute processing steps of embodying such a print processing method and to a memory medium in which such a computer program has been stored in a form which can be read out by the computer.

2. Related Background Art

Hitherto, for example, in an information processing apparatus on the side of a host such as a personal computer or the like, a process for generating print data for performing an N-up printing such that the user freely reduces a plurality of pages, arranges them onto a physical paper of one page, and prints them, a process for adding a page frame to the print data subjected to a reduction layout for the purpose of performing the N-up printing, or the like can be performed by a print processing method whereby the print data is once spooled and its style is processed.

An OS or a printer driver which is activated in the information processing apparatus provides a construction such that the user can define an output paper size, thereby enabling the print data to be printed to a paper of a favorite paper size of the user.

For example, with respect to the reduction layout mentioned above, an effective print area corresponding to the output paper size is equally divided and a drawing area of a logical page in an application of the printer driver is determined. With respect to the page frame, although it is also effective as a cutting line, a frame line as a cutting line is necessary only for a simplex (one side) in a duplex (both sides) printing mode.

However, according to the conventional print processing method as mentioned above, for example, if the user wants to print the print data in an irregular paper size represented by a system notebook or the like, since the maximum value and the minimum value of sizes which can be defined by the user (hereinafter, referred to as "user-defined sizes") are different for every printer, there is a problem such that the desired user-defined size of the user cannot be designated in dependence on a combination of a kind of printer and the user-defined size.

Therefore, in such a case, the user designates a reducing ratio by the printer driver and allows the reduced print data to be printed by the printer. Consequently, the user needs to adjust the reducing ratio so as to obtain the desired size, so that a burden on him is large.

When the desired output size is small, if a plurality of pages can be obtained from one physical page, the paper can be saved. In order to arrange a plurality of logical pages onto an output paper (physical paper) of one page, hitherto, there is a method of using the N-up function. However, according to the conventional N-up function, since the print data of the output size is reduced so as to be printed to N equal areas obtained by dividing the paper size designated as an "output size" by the printer driver, a desired result for the user cannot be obtained. This is because according to the N-up printing, the area designated by the "output size" of the printer driver is divided into N equal areas and, if the user desires a print result of the user-defined size, it is necessary that an output paper obtained by magnifying the user-defined size N times is prepared in the printer. This is also because in case of using a regular size paper as an output paper, the "output size" of the printer driver has to be designated to the regular size paper, and if such designation is made, since the print data is printed to the N equal areas obtained by dividing the regular size paper, the print result of the user-defined size cannot be obtained.

With respect to the function for adding the page frame (cutting line), for example, in case of performing the duplex printing, the page frame is drawn onto both sides and there is a problem such that the frame on the obverse and that on the reverse are deviated from each other in dependence on an error of the paper feed.

SUMMARY OF THE INVENTION

The invention is, therefore, made to eliminate the drawbacks as mentioned above and it is an object of the invention to provide an information processing apparatus, an information processing system, and a print processing method in which print data of an original size which is inputted is arranged to an output paper size different from the original size without being reduced, thereby enabling the print data to be easily printed irrespective of a restriction of the output paper size which can be defined by the user. It is also an object of the invention to provide a memory medium in which processing steps of embodying such a print processing method has been stored in a form which can be read out by a computer.

The invention is also made to eliminate the drawbacks as mentioned above and it is another object of the invention to provide an information processing apparatus, an information processing system, and a print processing method in which a page frame is effectively added and a printing process can be performed. It is also an object of the invention to provide a memory medium in which processing steps of embodying such a print processing method has been stored in a form which can be read out by a computer.

According to the invention, the above objects are accomplished by an information processing apparatus for performing a printing process, comprising: input means for inputting an arbitrary first output paper size included in a predetermined second output paper size; and layout means for arranging a plurality of pages of the first output paper size to one page of the second output paper size.

According to the invention, there is provided an information processing apparatus for controlling a printing operation in a printer which can perform a duplex printing, comprising: first input means for inputting an arbitrary first output paper size; second input means for inputting a second output paper size including the first output paper size; and layout means for arranging a plurality of pages of the first output paper size to a paper of the second output paper size on the basis of the first and second output paper sizes.

Further, it is desirable that the layout means adds a frame line to an obverse and a reverse of the paper of the second output paper size.

Further, the information processing apparatus has second designating means for performing the addition of the frame line by the layout means only to the reverse of the paper of the second output paper size, and it is desirable that the layout means adds the frame line only to the reverse of the paper of the second output paper size in accordance with designation by the second designating means. By adding the frame line, a cutting line can be effectively added.

The above and other objects and features of the present invention will become apparent from the following detailed description and the appended claims with reference to the accompanying drawings.

BRIEF DESCRIPTION OF THE DRAWINGS

FIG. 8 is a schematic diagram for explaining an example of data which is outputted by the spool file manager;

FIGS. 18A, 18B, 18C, 18D and 18E are schematic diagrams for explaining a layout of logical pages for a print order and a paper direction in an N-up printing in the automatic layout process.

DETAILED DESCRIPTION OF THE PREFERRED EMBODIMENTS

Embodiments of the invention will be described hereinbelow with reference to the drawings.

First Embodiment

Figure 1:
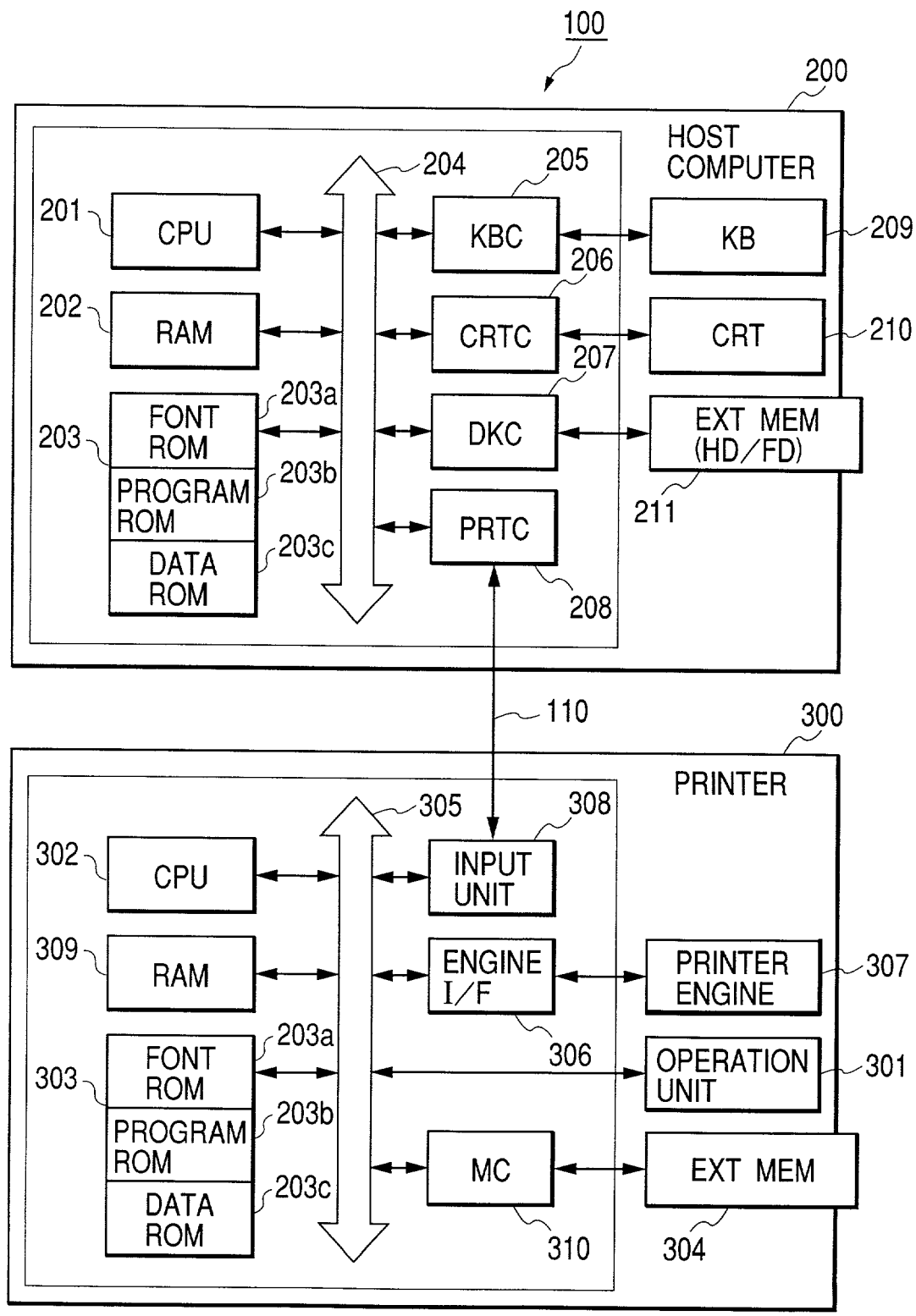
FIG. 1 is a block diagram showing a construction of a printer control system to which the invention is applied in the first embodiment.

The invention is applied to, for example, a printer control system 100 as shown in FIG. 1.

<Whole Construction of Printer Control System 100>

As shown in FIG. 1, the printer control system 100 of the embodiment is constructed in a manner such that a personal computer (host computer) 200 on the host side and a printer 300 can communicate mutually through a bidirectional interface 110.

In the embodiment, although the invention is applied to the system 100 in which the host computer 200 and printer 300 are connected, the invention is not limited to it. For example, the invention can be applied to a single apparatus, a system comprising a plurality of apparatuses, a system connected through a network such as LAN or WAN, and the like so long as functions, which will be explained hereinlater, in the embodiment are executed.

<Construction of Host Computer 200>

The host computer 200 comprises: a CPU 201; an RAM 202; an ROM 203; a keyboard controller (KBC) 205 of a keyboard (KB) 209; a CRT controller (CRTC) 206 of a CRT display (CRT) 210 as a display unit; a disk controller (DKC) 207 of an external memory 211 such as hard disk (HD), floppy disk (FD), or the like; and a printer controller (PRTC) 208 for accessing the printer 300. Those component elements are connected so that they can communicate mutually through a system bus 204.

The printer controller (PRTC) 208 is connected to the printer 300 through the bidirectional interface 110.

The CPU 201 controls the operation of the whole host computer 200. For example, the CPU 201 reads out a text processing program or the like stored in a program ROM 203b of the ROM 203 (or in the external memory 211) and executes it, thereby processing a text in which a figure, an image, characters, a table (spreadsheet, etc.), and the like exist mixedly.

The CPU 201 executes, for example, a developing (rasterizing) process of an outline font to display information set onto the RAM 202, thereby enabling WYSIWYG (What You See Is What You Get) on the CRT display 210 to be realized.

The CPU 201 opens various registered windows on the basis of commands instructed by a mouse cursor (not shown) on the CRT display 210 and executes various data processes.

Thus, for example, in case of executing a printing process, the user opens the window regarding the print setting and performs setting of the printer and setting of a print processing method including a selection of a printing mode and the like to a printer driver, thereby enabling the printing process according to the setting contents to be executed.

The ROM 203 includes a font ROM 203a, the program ROM 203b, and a data ROM 203c.

A control program (OS: operating system program) for an operation control in the CPU 201 and the like have been stored in the program ROM 203b.

Font data and the like which are used when the text process or the like is executed has been stored in the font ROM 203a.

Various data which are used when the text process or the like is executed has been stored in the data ROM 203c.

The RAM 202 functions as a main memory, a work area, or the like of the CPU 201.

The control program stored in the program ROM 203b, the font data stored in the font ROM 203a, the various data stored in the data ROM 203c, and the like can be also stored in the external memory 211.

The keyboard controller (KBC) 205 controls a key input from the keyboard (KB) 209 or a pointing device (not shown).

The CRT controller (CRTC) 206 controls the display operation of the CRT display (CRT) 210.

The disk controller (DKC) 207 controls an access to the external memory 211 such as hard disk (HD), floppy disk (FD), or the like for storing a boot program, various applications, font data, a user file, an edition file, a printer control command forming program (hereinafter, also referred to as a "printer driver"), and the like.

The printer controller (PRTC) 208 executes a communication control process for communicating with the printer 300 via the bidirectional interface 110.

<Construction of Printer 300>

The printer 300 comprises: a CPU 302; an RAM 309; an ROM 303; an input unit 308; an interface (engine I/F) 306 of a printer engine 307; an operation unit 301; and a controller (MC) 310 of an external memory 304. Those component elements are connected so that they can communicate mutually through a system bus 305.

The input unit 308 is connected to the host computer 200 via the bidirectional interface 110.

The CPU 302 controls the operation of the whole printer 300. For example, the CPU 302 reads out a control program stored in a program ROM 303b of the ROM 303 (or in the external memory 304) and executes it, thereby outputting an image signal as output information to the printer engine 307 through the engine I/F 306.

The ROM 303 includes a font ROM 303a, the program ROM 303b and a data ROM 303c.

A control program for an operation control in the CPU 302 and the like have been stored in the program ROM 303b.

Font data and the like which are used when the image signal which is outputted to the printer engine 307 is generated has been stored in the font ROM 303a.

Information and the like which are used on the host computer 200 in the case where the external memory 304 such as a hard disk or the like is not provided have been stored in the data ROM 303c.

The RAM 309 functions as a main memory, a work area, or the like of the CPU 302.

A memory capacity of the RAM 309 can be expanded by an option RAM which is connected to an expansion port (not shown).

The RAM 309 is also used as an output information rasterizing area, an environmental data memory area, an NVRAM, or the like.

The memory controller (MC) 310 controls an access to the external memory 304 such as hard disk (HD), IC card, or the like.

The external memory 304 can be connected as an option and stores font data, an emulation program, form data, and the like.

The operation unit 301 includes an operation panel and the like and has switches, an LED display, and the like for various operating instructions.

The input unit 308 is used for communicating with the host computer 200 and can notify the host computer 200 of various information or the like in the printer 300.

Although the printer 300 is constructed so that one external memory 304 is provided, the invention is not limited to it. For example, a plurality of external memories can be also provided. In addition to the font data, an option card or a program to interpret printer control languages of different language systems can be also stored into those external memories.

For example, it is also possible to provide NVRAM and allow printer mode information or the like set by the operation unit 301 to be stored into the NVRAM.

<Functional Construction for Printing Process in Host Computer 200>

Figure 2:
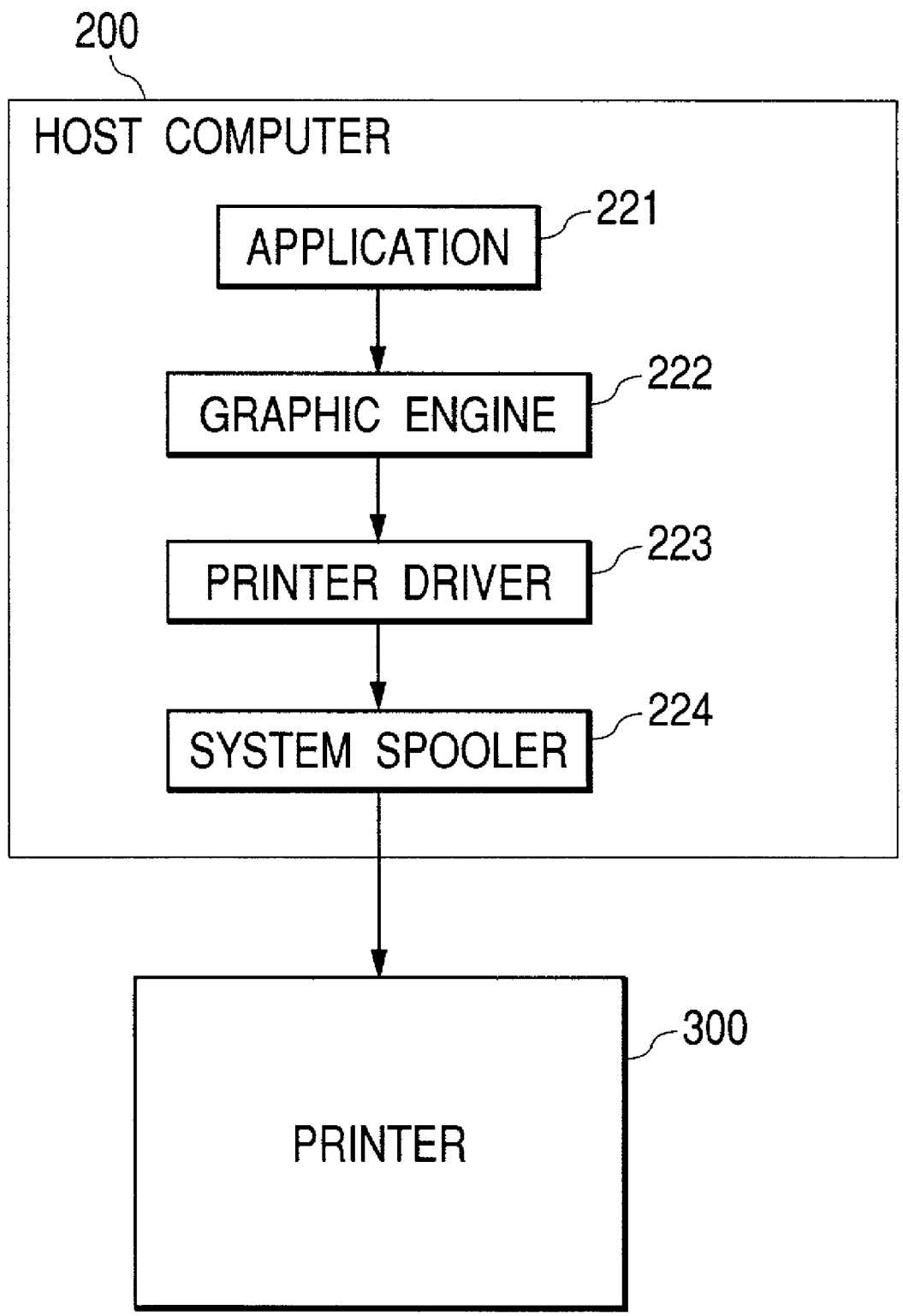
FIG. 2 is a block diagram showing a functional construction of a host computer of the printer control system.

FIG. 2 functionally shows a construction for allowing the host computer 200 to execute the printing process by the printer 300 which is connected directly or via the network.

As shown in FIG. 2, in the host computer 200, an application 221, a graphic engine 222, a printer driver 223 and a system spooler 224 have been stored as files into the external memory 211.

The application 221, graphic engine 222, printer driver 223 and system spooler 224 are program modules which are loaded into the RAM 202 and executed by the CPU 201 as necessary.

That is, the application 221, graphic engine 222, printer driver 223 and system spooler 224 are constructive portions for embodying functions of the embodiment by being loaded into the RAM 202 and executed by the CPU 201 as necessary.

The application 221 and printer driver 223 can be added to the FD as an external memory 211, a CD-ROM (not shown), or an HD as an external disk 211 via the network (not shown).

The application 221 stored in the external memory 211 is loaded into the RAM 202 and executed by the CPU 201. However, in case of executing the printing process in the printer 300 by the execution of the application 221, the application 221 loads the graphic engine 222 stored in the external memory 211 into the RAM 202 and executes it. Thus, the output (drawing) using the graphic engine 222 is executed.

The graphic engine 222 loads the printer driver 223 prepared for every printer (printer driver corresponding to the printer 300 here) into the RAM 202 from the external memory 211 and sets output information of the application 221 into the printer driver 223.

For example, the graphic engine 222 converts a GDI (Graphic Device Interface) function as a drawing function which is received from the application 221 into a DDI (Device Driver Interface) function as a device control function which can be interpreted by the printer driver and sets the DDI function into the printer driver 223.

The printer driver 223 converts an input command into a control command which can be recognized by the printer 300, for example, into a PDL (Page Description Language) on the basis of the DDI function set from the graphic engine 222.

The system spooler 224 stored in the external memory 211 is loaded into the RAM 202 and executed by the CPU 201.

The control command which has been converted into the PDL by the printer driver 223 and is sent to the printer 300 is outputted as print data to the printer 300 via the interface 110 by the system spooler 224.

Figure 3:
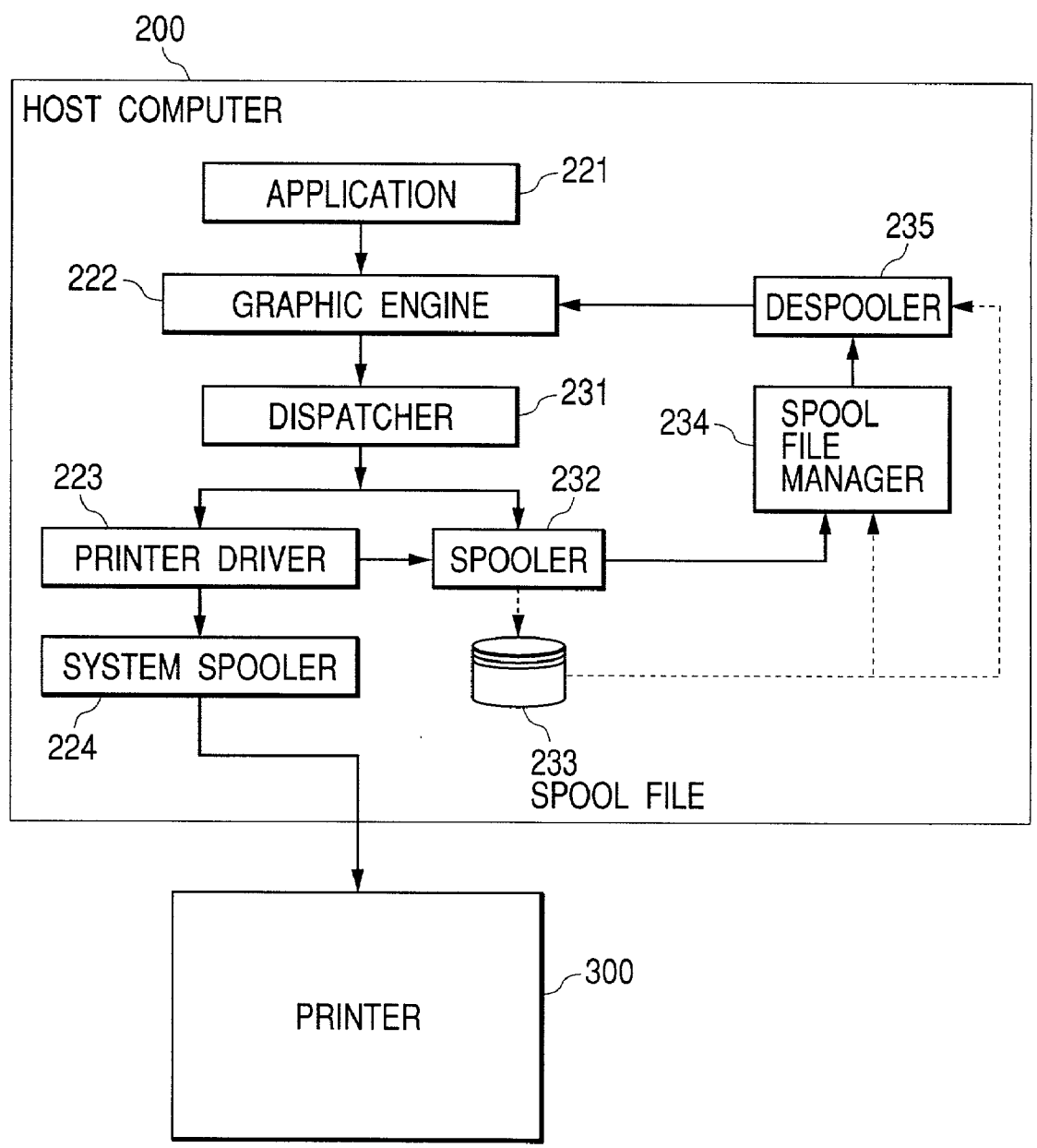
FIG. 3 is a block diagram showing a construction obtained by expanding the function of the host computer.

FIG. 3 shows a construction obtained by expanding the construction shown in FIG. 2.

In addition to the construction shown in FIG. 2, the host computer 200 shown in FIG. 3 has a construction such that the print data from the application 221 is once spooled as intermediate code data.

For this purpose, the host computer 200 has a dispatcher 231, a spooler 232, a spool file 233, a spool file manager 234 and a despooler 235 together with the application 221, graphic engine 222, printer driver 223 and system spooler 224.

In the construction shown in FIG. 2, the timing when the application 221 is released from the printing process is the point in time when the printer driver 223 has finished converting all print commands from the graphic engine 222 into control commands of the printer 300.

On the other hand, in the construction shown in FIG. 3, the timing when the application 221 is released from the printing process is set to the point in time when the spooler 232 has converted all of the print commands into intermediate code data and outputted them as print data to the spool file 233, thereby shortening the processing time.

In the construction shown in FIG. 3, the print data stored in the spool file 233 can be processed. Thus, functions which the application 221 does not have can be realized. Examples of such functions include a function such that the print data outputted from the application 221 is magnified or reduced and printed, a function such that a plurality of pages of the print data are reduced and printed onto one page, and the like.

To realize the construction as mentioned above, in the construction shown in FIG. 3, an expanding process for spooling all of the print commands by the intermediate code data is performed by the construction shown in FIG. 2.

In case of processing the print data in the spool file 233, for example, the user performs setting from the window which is provided by the printer driver 223. Thus, the printer driver 223 stores setting contents from the user into the RAM 202 or external memory 211.

The construction shown in FIG. 3 will now be specifically explained. First, the dispatcher 231 receives the print command from the graphic engine 222.

If the print command received from the graphic engine 222 is a print command issued from the application 221 to the graphic engine 222, the dispatcher 231 loads the spooler 232 stored in the external memory 211 into the RAM 202 and sends the print command to the spooler 232 instead of the printer driver 223.

Processes which are executed in the case where the print command received from the graphic engine 222 is the print command issued from the despooler 235 to the graphic engine 222 will be explained hereinlater.

The spooler 232 converts the print command issued from the dispatcher 231 into the intermediate code data and outputs it to the spool file 233.

The spooler 232 obtains print setting regarding the print data set to the printer driver 223 from the printer driver 223 and stores it into the spool file 233.

Although the spool file 233 has been generated as a file into the external memory 211, the invention is not limited to it. For example, it can be also generated in the RAM 202.

The spooler 232 loads the spool file manager 234 stored in the external memory 211 into the RAM 202 and notifies the spool file manager 234 of a generating situation of the spool file 233.

On the basis of the notification from the spooler 232, the spool file manager 234 discriminates whether the printing process can be executed in accordance with the contents of the print setting regarding the print data stored in the spool file 233 or not.

If it is determined as a result of the discrimination that the printing process can be executed, the spool file manager 234 loads the despooler 235 stored in the external memory 211 into the RAM 202 and instructs the despooler 235 to execute the printing process of the intermediate code data stored in the spool file 233.

The despooler 235 processes the intermediate code data stored in the spool file 233 in response to the instruction from the spool file manager 234 in accordance with the contents of the print setting stored in the spool file 233 together with the intermediate code data, and outputs the processed intermediate code again as a print command via the graphic engine 222.

If the print command received from the graphic engine 222 is a print command issued from the despooler 235 to the graphic engine 222, the dispatcher 231 sends the print command to the printer driver 223 instead of the spooler 232.

The printer driver 223 converts the print command from the dispatcher 231 into a control command for the printer 300 and outputs it to the printer 300 via the system spooler 224.

<Duplex Printing Function of Printer 300>

Figure 4:
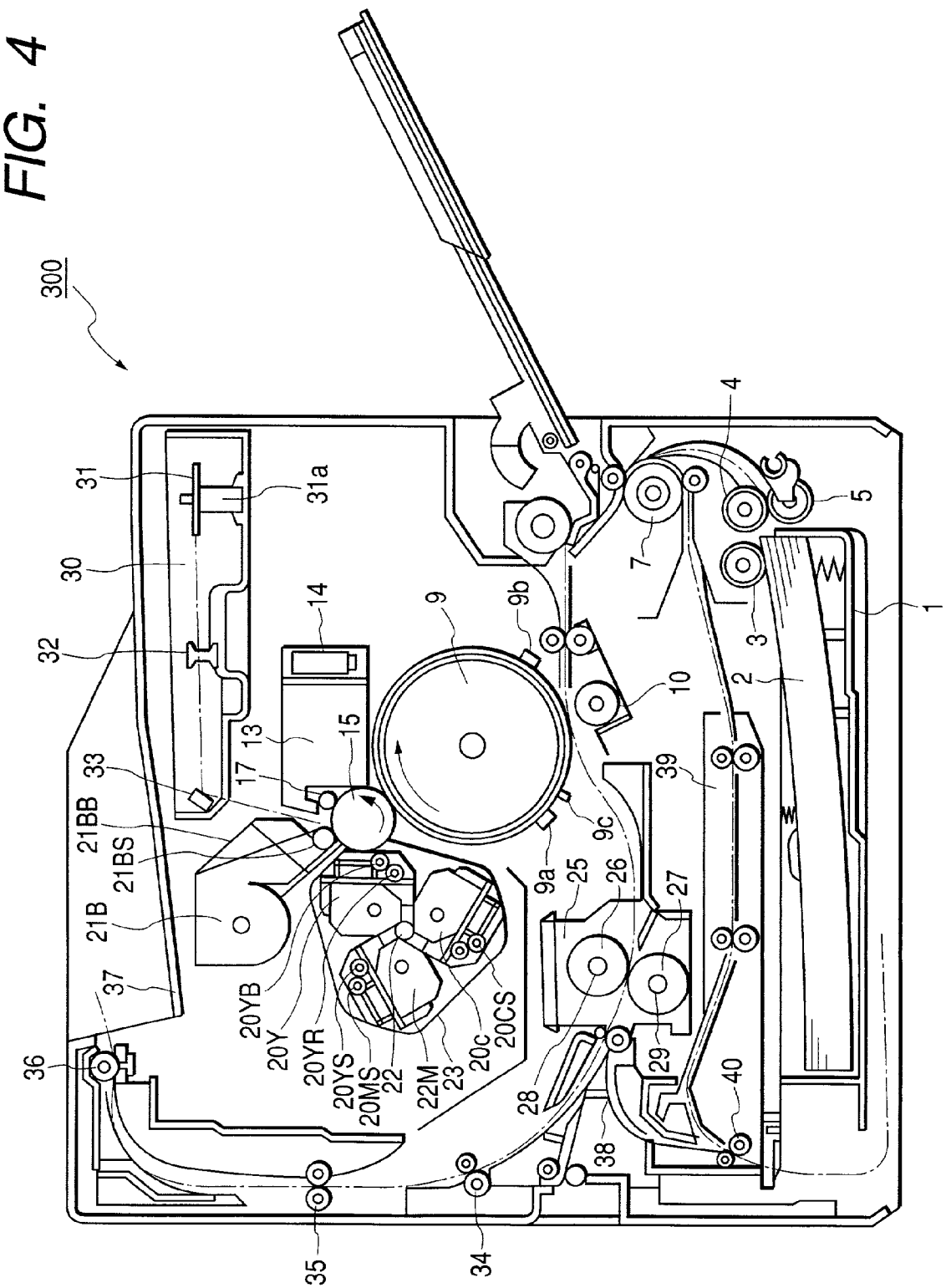
FIG. 4 is a schematic cross-sectional view showing a construction of a printer of the printer control system.

FIG. 4 shows a construction of the duplex printing function of the printer 300.

In FIG. 4, for example, the printer 300 is a color laser printer and a cross sectional view thereof is illustrated.

In the printer 300 in FIG. 4, first, a laser beam modulated by image data of each color obtained on the basis of the print data from the host computer 200 is scanned onto a photosensitive drum 15 by a polygon mirror 31, thereby forming an electrostatic latent image. By developing the electrostatic latent image by toner, a visible image is obtained. The visible images regarding all colors are multiplexed and transferred onto an intermediate transfer material 9, thereby forming a color visible image. The color visible image is further transferred onto a transfer material 2, thereby fixing the color visible image onto the transfer material 2.

An image forming unit for executing the operation as mentioned above is constructed by: a drum unit 13 having the photosensitive drum 15; a primary charging unit having a contact charging roller 17; a cleaning unit; a developing unit; the intermediate transfer material 9; a paper feeding unit including a paper cassette 1 and various rollers 3, 4, 5 and 7; a transfer unit including a transfer roller 10; and a fixing unit 25.

The drum unit 13 is constructed by integrating the photosensitive drum (photosensitive material) 15 and a cleaner tank 14 having a cleaning mechanism also functioning as a holder of the photosensitive drum 15.

The drum unit 13 is detachably supported to the printer 300 main body and can be easily exchanged on a unit basis in accordance with a life of the photosensitive drum 15.

The photosensitive drum 15 is formed by coating an organic photoconductive layer onto an outer periphery of an aluminum cylinder and is rotatably supported to the cleaner tank 14.

The photosensitive drum 15 is rotated when a driving force of a driving motor (not shown) is transferred. The driving motor rotates the photosensitive drum 15 counter-clockwise in accordance with the image forming operation.

By selectively exposing the surface of the photosensitive drum 15, the electrostatic latent image is formed.

In a scanner unit 30, the modulated laser beam is reflected by the polygon mirror which is rotated by a motor 31 a synchronously with a horizontal sync signal of the image signal and irradiates the photosensitive drum 15 through a lens 32 and a reflecting mirror 33.

In order to form a visible image from the electrostatic latent image formed on the photosensitive drum 15, the developing unit has: three color developing units 20Y, 20M and 20C for developing the images of the colors yellow (Y), magenta (M) and cyan (C); and one black developing unit 21B for developing a black image (B).

The color developing units 20Y, 20M and 20C and the black developing unit 21B are provided with: sleeves 2OYS, 2OMS, 2OCS and 2lBS; and coating blades 2OYB, 20MB, 2OCB and 21BB which come into pressure contact with outer peripheries of the sleeves 20YS, 2OMS, 2OCS and 21BS, respectively.

Coating rollers 20YR, 20MR and 20CR are provided for the color developing units 20Y, 20M and 20C.

The black developing unit 21B is detachably attached to the printer 300 main body. The color developing units 20Y, 20M and 20C are detachably attached to a developing rotary unit 23 which rotates around a rotary axis 22 as a center, respectively.

The sleeve 21BS of the black developing unit 21B is arranged at a micro interval of, for example, about 300 µm from the photosensitive drum 15.

The black developing unit 21B conveys the toner by a feeding member built in the black developing unit 21B and applies charges to the toner by a frictional charging so that the toner is coated by the coating blade 21BB onto the outer periphery of the sleeve 21BS which rotates clockwise. The black developing unit 21B applies a developing bias to the sleeve 21BS, thereby developing the image on the photosensitive drum 15 in accordance with the electrostatic latent image and forming a visible image by the black toner onto the photosensitive drum 15.

Each of the color developing units 20Y, 20M and 20C is rotated in association with the rotation of the developing rotary unit 23 upon image formation. In this instance, a predetermined one of the sleeves 2OYS, 2OMS and 2OCS faces the photosensitive drum 15 at a micro interval of about 300 µm. Thus, a predetermined one of the color developing units 20Y, 20M and 20C is stopped at the developing position which faces the photosensitive drum 15, thereby forming the visible image onto the photosensitive drum 15.

Upon color image formation, the developing rotary unit 23 is rotated every rotation of the intermediate transfer material 9. Developing steps are sequentially executed in order of the color developing unit 20Y (yellow developing unit), the color developing unit 20M (magenta developing unit), the color developing unit 20C (cyan developing unit) and the black developing unit 21B. The intermediate transfer material 9 is rotated four times and the visible images by the yellow, magenta, cyan, and black toner are sequentially formed, so that a full color visible image is formed on the intermediate transfer material 9.

The intermediate transfer material 9 comes into contact with the photosensitive drum 15 and is rotated in association with the rotation of the photosensitive drum 15. Upon color image formation, the intermediate transfer material 9 is rotated clockwise and the visible images are multiplexed and transferred onto the material 9 four times from the photosensitive drum 15.

Upon image formation, the transfer roller 10, which will be explained hereinlater, comes into contact with the intermediate transfer material 9 and the transfer material 2 is sandwiched therebetween and conveyed, so that the color visible image on the intermediate transfer material 9 is simultaneously multiplexed and transferred onto the transfer material 2.

A TOP sensor 9a and an RS sensor 9b for detecting the position regarding the rotating direction of the intermediate transfer material 9 and a concentration sensor 9c for detecting a concentration of the toner image transferred onto the intermediate transfer material 9 are arranged in the outer peripheral portion of the intermediate transfer material 9.

The transfer roller 10 has a transfer charging unit supported so that it can be come into contact with and be away from the photosensitive drum 15. The transfer roller 10 is formed by winding a foam elastic material around a metal axis.

While the color visible image is being multiplexed and transferred onto the intermediate transfer material 9, the transfer roller 10 is positioned downwardly away from the material 9 so as not to disturb the color visible image. After the color visible images of four colors are formed onto the intermediate transfer material 9, the transfer roller 10 is moved upward by a cam member (not shown) in accordance with the timing for transferring the color visible image onto the transfer material 2. Thus, the transfer roller 10 comes into pressure contact with the intermediate transfer material 9 with a predetermined suppressing force through the transfer material 2. A bias voltage is applied to the transfer roller 10. The color visible image on the intermediate transfer material 9 is transferred onto the transfer material 2.

The fixing unit 25 fixes the transferred color visible image while conveying the transfer material 2 and has: a fixing roller 26 for heating the transfer material 2; and a pressing roller 27 for allowing the transfer material 2 to be come into pressure contact with the fixing roller 26.

Each of the fixing roller 26 and the pressing roller 27 is formed in a hollow shape and heaters 28 and 29 are built therein, respectively.

That is, the transfer material 2 holding the color visible image is conveyed by the fixing roller 26 and pressing roller 27 and heat and a pressure are applied to it, so that the toner is fixed on the surface of the transfer material 2.

After that, the transfer material 2 obtained after the fixing of the visible image is ejected to a paper ejecting unit 37 by paper ejecting rollers 34, 35 and 36, so that the image forming operation is finished.

The cleaning unit cleans the toner remaining on the photosensitive drum 15 and intermediate transfer material 9.

The waste toner obtained after the visible image by the toner formed on the photosensitive drum 15 was transferred onto the intermediate transfer material 9 or the waste toner obtained after the color visible images of four colors formed on the intermediate transfer material 9 were transferred onto the transfer material 2 is stored into the cleaner tank 14.

The transfer material (recording paper) 2 to be printed is taken out of the paper feed tray 1 by the paper feed roller 3 and conveyed in a state where it is sandwiched between the intermediate transfer material 9 and transfer roller 10. The color toner image is recorded onto the transfer material 2. The transfer material 2 passes through the fixing unit 25 and the toner image is fixed thereon.

In case of a simplex printing process, a guide 38 forms a conveying path so as to guide the recording paper to the upper paper ejecting unit. In a duplex printing mode, the guide 38 forms a conveying path so as to guide the recording paper to a lower duplex unit.

The recording paper guided to the duplex unit is once fed to a position (conveying path shown by an alternate long and short dash line) under the tray 1 by a conveying roller 40. After that, the paper is conveyed in the opposite direction and sent to a duplex tray 39.

On the duplex tray 39, an obverse/reverse state of the recording paper is set to a state opposite to that in the case where the paper is put on the paper feed tray 1 and a front/rear state regarding the conveying direction is also opposite. By transferring and fixing the toner image again in this state, the duplex printing can be performed.

<Operation of Printer Control System 100>

Figure 5:
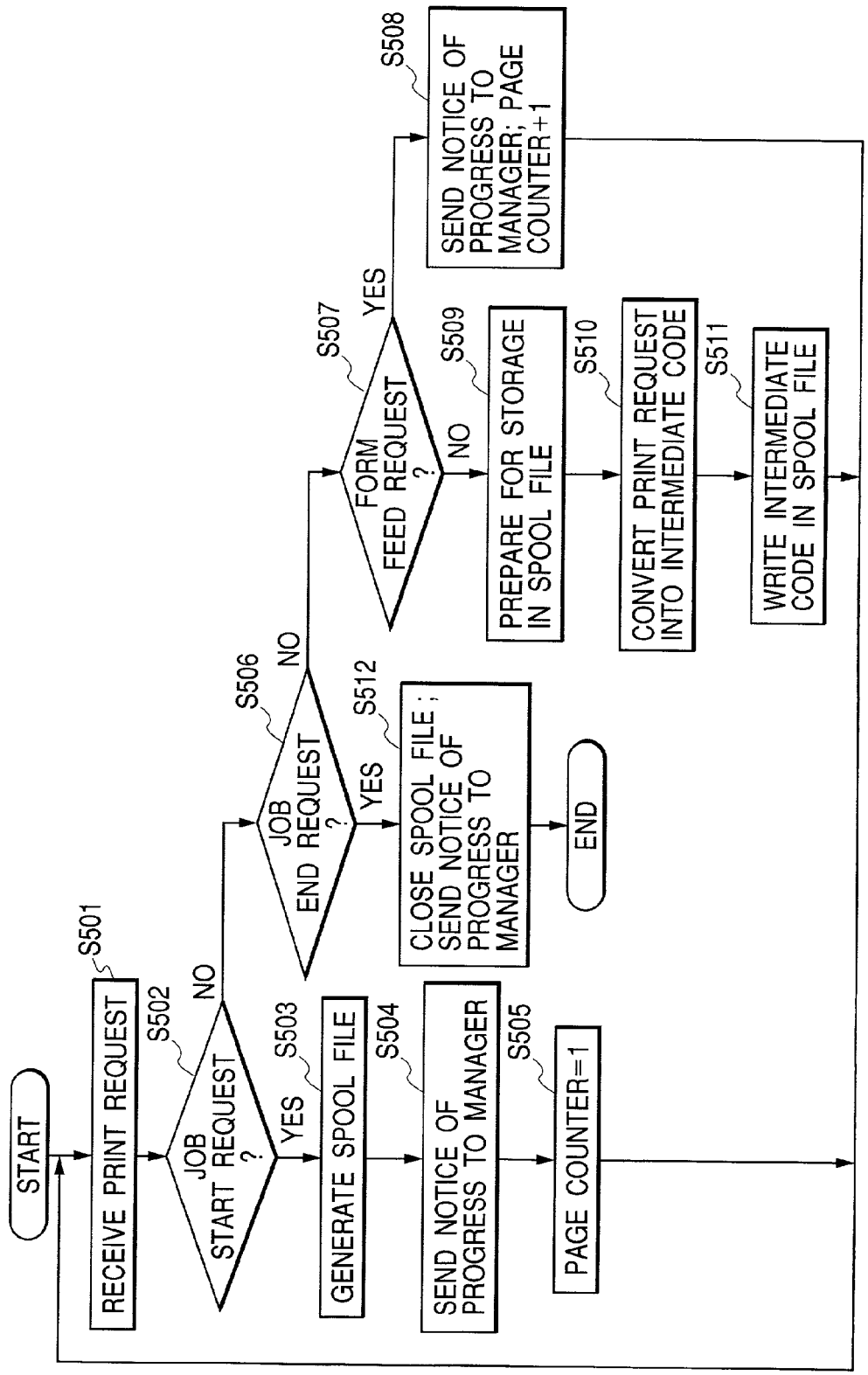
FIG. 5 is a flowchart for explaining the operation of a spooler of the host computer.

First, FIG. 5 is a flowchart showing a page unit storing process into the spool file 233 in the spooler 232 shown in FIG. 3.

Step S501:

The spooler 232 receives a print command (also referred to as a "print request" hereinbelow) from the application 221 through the printer driver 223.

Figure 6:
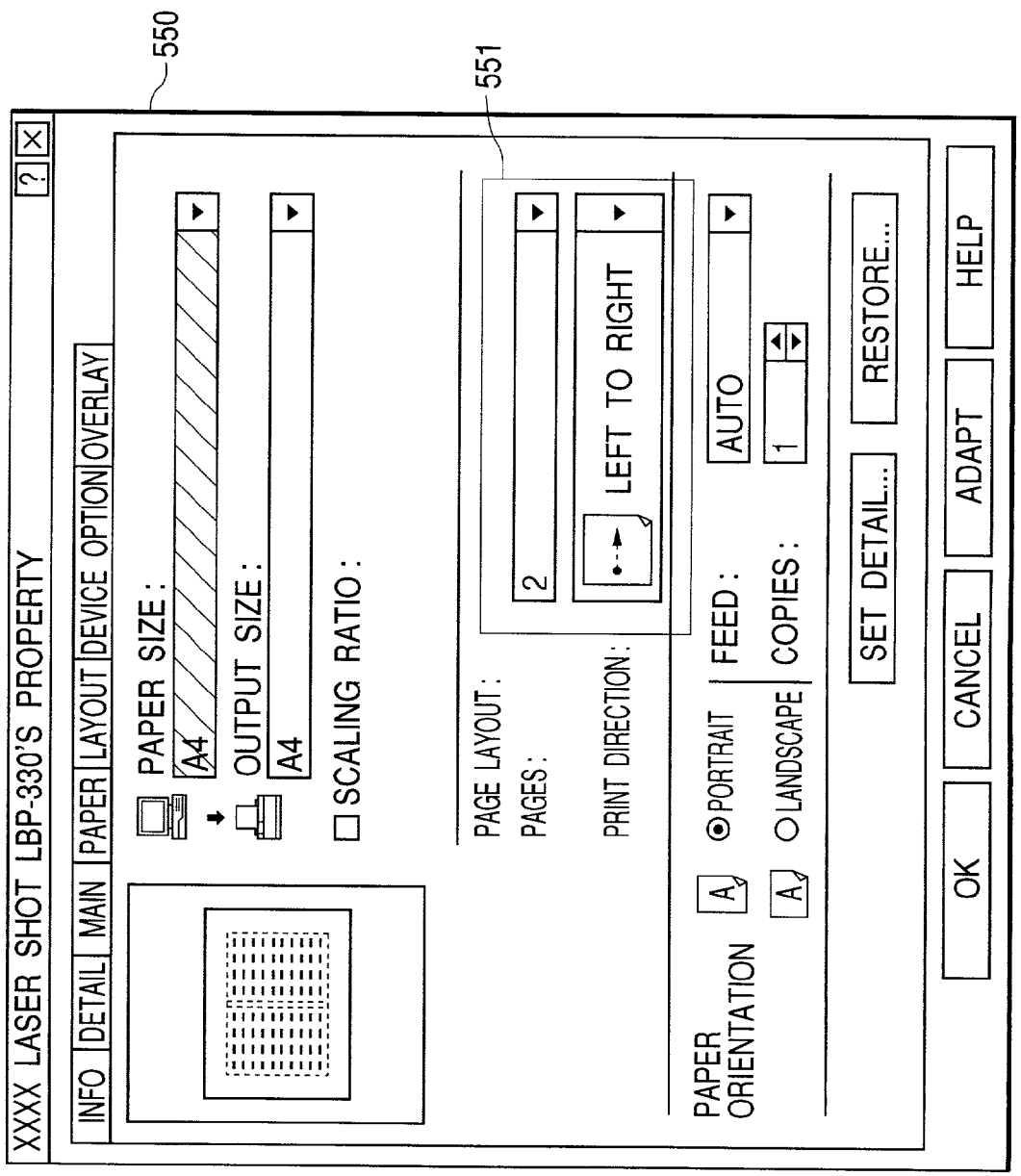
FIG. 6 is a schematic diagram for explaining an example of a print setting picture plane in the host computer.

Specifically speaking, for example, a dialog picture plane 550 for inputting a print setting as shown in FIG. 6 is displayed on the CRT display 210 by the application 221. The printer driver 223 obtains print setting information inputted from the dialog picture plane 550 by the user and supplies it to the spooler 232.

The dialog picture plane 550 of FIG. 6 includes a setting item as shown at "551" for determining the number of logical pages to be arranged onto the physical page, and the like.

Step S502:

The spooler 232 discriminates whether the print request received in step S501 is a job start request or not.

In case of the job start request as a result of the discrimination, step S503 follows. If NO, the processing routine advances to step S506, which will be explained hereinlater.

Steps S503, S504 and S505:

In case of the job start request as a result of the discrimination in step S502, the spooler 232 generates the spool file 233 for temporarily storing the intermediate code data (step S503).

Subsequently, the spooler 232 notifies (job start notice) the spool file manager 234 of the progress of the printing process (step S504).

The spooler 232 initializes a page number counter to "1".

At this time, the spool file manager 234 obtains job information, print setting, and the like of a job whose printing process has been started from the spool file 233 and stores them.

After that, the processing routine is returned to step S501 and the subsequent processing steps are repetitively executed.

Step S506:

As a result of the discrimination in step S502, if the print request received in step S501 is not the job start request, the spooler 232 discriminates whether the print request is a job end request or not.

In case of the job end request as a result of the discrimination, the processing routine advances to step S512, which will be explained hereinlater. If NO, next step S507 follows.

Step S507:

As a result of the discrimination in step S506, if the print request received in step S501 is not the job end request, the spooler 232 discriminates whether the print request is a form feed request or not.

In case of the form feed request as a result of the discrimination, the processing routine advances to next step S508. If NO, the processing routine advances to step S509, which will be explained hereinlater.

Step S508:

As a result of the discrimination in step S507, if the print request received in step S501 is the form feed request, the spooler 232 notifies the spool file manager 234 of the progress of the printing process (print end notice of one logical page).

The spooler 232 increases a count value of the page number counter.

After that, the processing routine is returned to step S501 and the subsequent processing steps are repetitively executed.

Steps S509, S510 and S511:

As a result of the discrimination in step S507, if the print request received in step S501 is not the form feed request, the spooler 232 prepares for storage of the intermediate code data into the spool file 233 (step S509).

The spooler 232 subsequently converts the print request into the intermediate code data in order to store the print request into the spool file 233 (step S510).

The spooler 232 stores the intermediate code data obtained in step S510 into the spool file 233.

After that, the processing routine is returned to step S501 and the subsequent processing steps are repetitively executed.

Step S512:

As a result of the discrimination in step S506, if the print request received in step S501 is the job end request, the spooler 232 recognizes the fact that the whole print request from the application 221 has been finished, and notifies the spool file manager 234 of the progress of the printing process (spool end notice). After that, the processing routine is finished.

Figure 7:
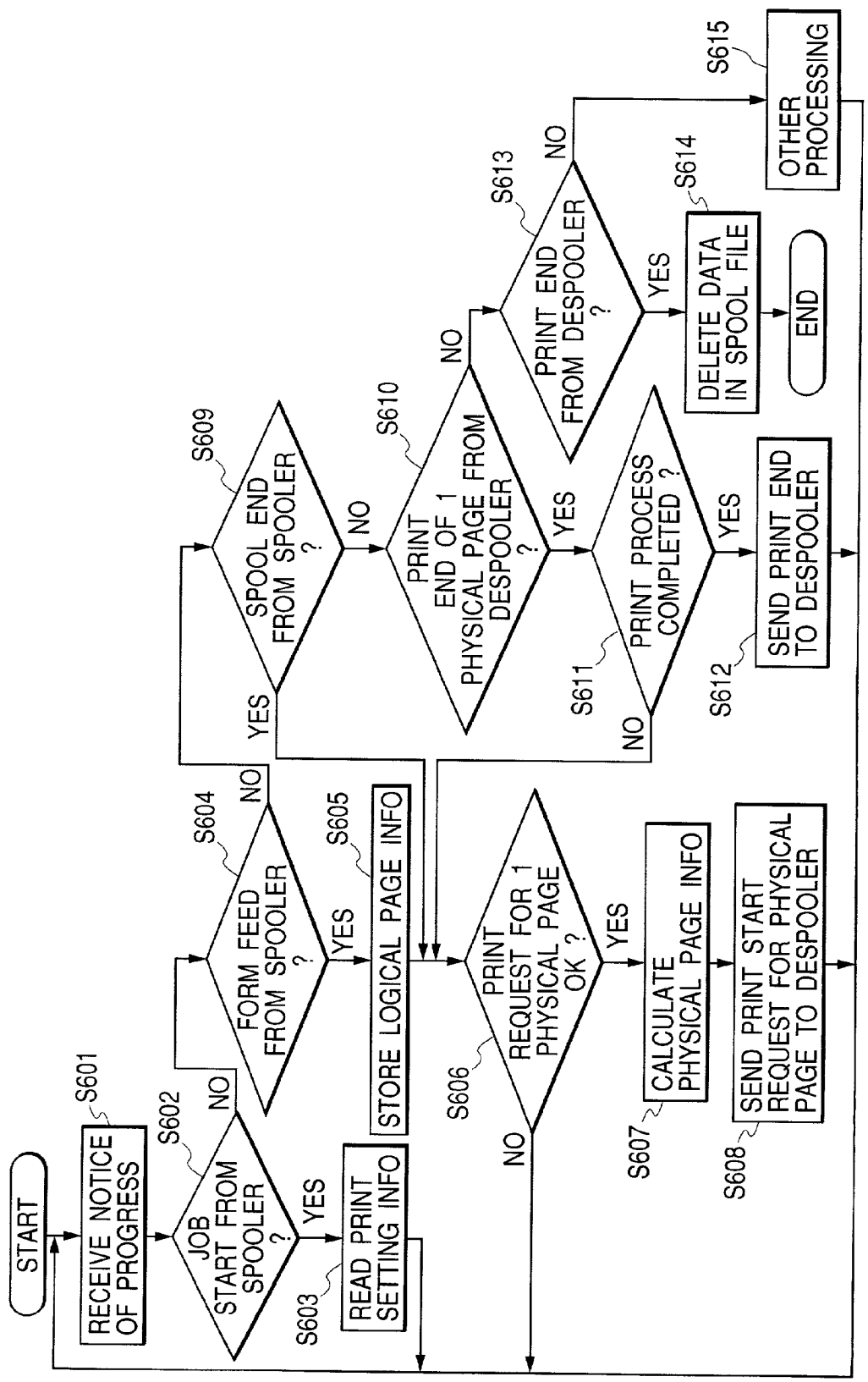
FIG. 7 is a flowchart for explaining the operation of a spool file manager of the host computer.

FIG. 7 is a flowchart showing processes for an access to the spool file 233 and a control in the spool file manager 234 shown in FIG. 3.

Step S601:

The spool file manager 234 receives the notice of progress of the printing process from the spooler 232 or despooler 235.

Step S602:

The spool file manager 234 discriminates whether the notice in step S601 is a job start notice (print start notice) notified by the spooler 232 in step S504 in FIG. 5 or not.

In case of the print start notice as a result of the discrimination, next step S603 follows. If NO, the processing routine advances to step S604, which will be explained hereinlater.

Step S603:

In case of the print start notice as a result of the discrimination in step S602, the spool file manager 234 obtains the information regarding the print setting from the spool file 233 and starts management of the print job.

After that, the processing routine is returned to step S601 and the subsequent processing steps are repetitively executed.

Step S604:

As a result of the discrimination in step S602, if the notice is not the print start notice, the spool file manager 234 discriminates whether the notice in step S601 is a print end notice (form feed notice) of one logical page notified by the spooler 232 in step S508 in FIG. 5 or not.

In case of the print end notice of one logical page as a result of the discrimination, next step S605 follows. If NO, the processing routine advances to step S609, which will be explained hereinlater.

Steps S605 and S606:

In case of the print end notice of one logical page as a result of the discrimination in step S604, the spool file manager 234 holds logical page information for the logical page (step S605).

The spool file manager 234 discriminates whether the printing of one physical page for the N logical pages whose spooling has been finished at this point of time can be started or not (whether the print request to the printer 300 can be made or not) (step S606). Specifically speaking, in the user interface of the printer driver shown in FIG. 10, if the user designates "8 pages/sheet" as a page layout 1001, whether the printing of the physical page can be started or not can be discriminated by checking whether eight logical pages have been held or not. If "auto layout of the designated size" (refer to FIG. 15) has been designated as a page layout, it is necessary to discriminate an area and discriminate about the start of the printing as will be explained hereinlater in FIG. 16.

If the print request can be made as a result of the discrimination, next step S607 follows. If NO, the processing routine is returned to step S601.

Step S607:

If the print request can be made as a result of the discrimination in step S606, the spool file manager 234 determines the physical page number from the number of logical pages which are assigned to one physical page to be printed.

As for a method of deciding the physical page number here, for example, if the print setting information has been set so as to arrange four logical pages to one physical page, the first physical page can be printed at the point when the fourth logical page has been spooled. Subsequently, the second physical page can be printed at the point when the eighth logical page has been spooled.

Even if the total number of logical pages is not equal to a multiple of the number of logical pages which are arranged to one physical page, the number of logical pages which are arranged to one physical page can be arbitrarily determined by the spool end notice in step S512 shown in FIG. 5.

Step S608:

The spool file manager 234 notifies the despooler 235 of information as shown in, for example, FIG. 8, that is, information such as logical page number constructing the printable physical page, physical page number, and the like (print start request notice of the physical page).

After that, the processing routine is returned to step S601 and the subsequent processing steps are repetitively executed.

In the embodiment, even if the spool of the print job is not completely finished at the point when one page of the print data, that is, the logical pages constructing one physical page have been spooled, the printing process can be performed.

Step S609:

If the notice is not the print end notice of one logical page as a result of the discrimination in step S604, the spool file manager 234 discriminates whether the notice in step S601 is a spool end notice (job end notice) notified by the spooler 232 in step S512 in FIG. 5 or not.

In case of the spool end notice as a result of the discrimination, step S606 mentioned above follows. If NO, the processing routine advances to next step S610.

Step S610:

If the notice is not the spool end notice as a result of the discrimination in step S609, the spool file manager 234 discriminates whether the notice in step S601 is a print end notice of one physical page from the despooler 235 or not.

In case of the print end notice of one physical page as a result of the discrimination, next step S611 follows. If NO, the processing routine advances to step S613, which will be explained hereinlater.

Step S611:

If the notice is the print end notice of one physical page as a result of the discrimination in step S610, the spool file manager 234 discriminates whether the whole printing process according to the print setting has been finished or not.

As a result of the discrimination, if the printing process has been completely finished, next step S612 follows. If NO, the processing routine is returned to step S606 mentioned above.

Step S612:

As a result of the discrimination in step S611, if the printing process has been completely finished, the spool file manager 234 notifies the despooler 235 of the end of the printing.

After that, the processing routine is returned to step S601 and the subsequent processing steps are repetitively executed.

It is presumed that in the despooler 235 in the embodiment, the number of physical pages which can be simultaneously printed is equal to "1".

Step S613:

As a result of the discrimination, if the notice is not the print end notice of one physical page, the spool file manager 234 discriminates whether the notice in step S601 is the print end notice from the despooler 235 or not.

As a result of the discrimination in step S610, if the printing process has been completely finished, next step S614 follows. If NO, the processing routine advances to step S615, which will be explained hereinlater.

Step S614:

In case of the print end notice as a result of the discrimination in step S613, the spool file manager 234 deletes the relevant data in the spool file 233 and the present processing routine is finished.

Step S615:

If the notice is not the print end notice as a result of the discrimination in step S613, the spool file manager 234 executes the process corresponding to the notice in step S601.

After that, the processing routine is returned to step S601 and the subsequent processing steps are repetitively executed.

Figure 9:
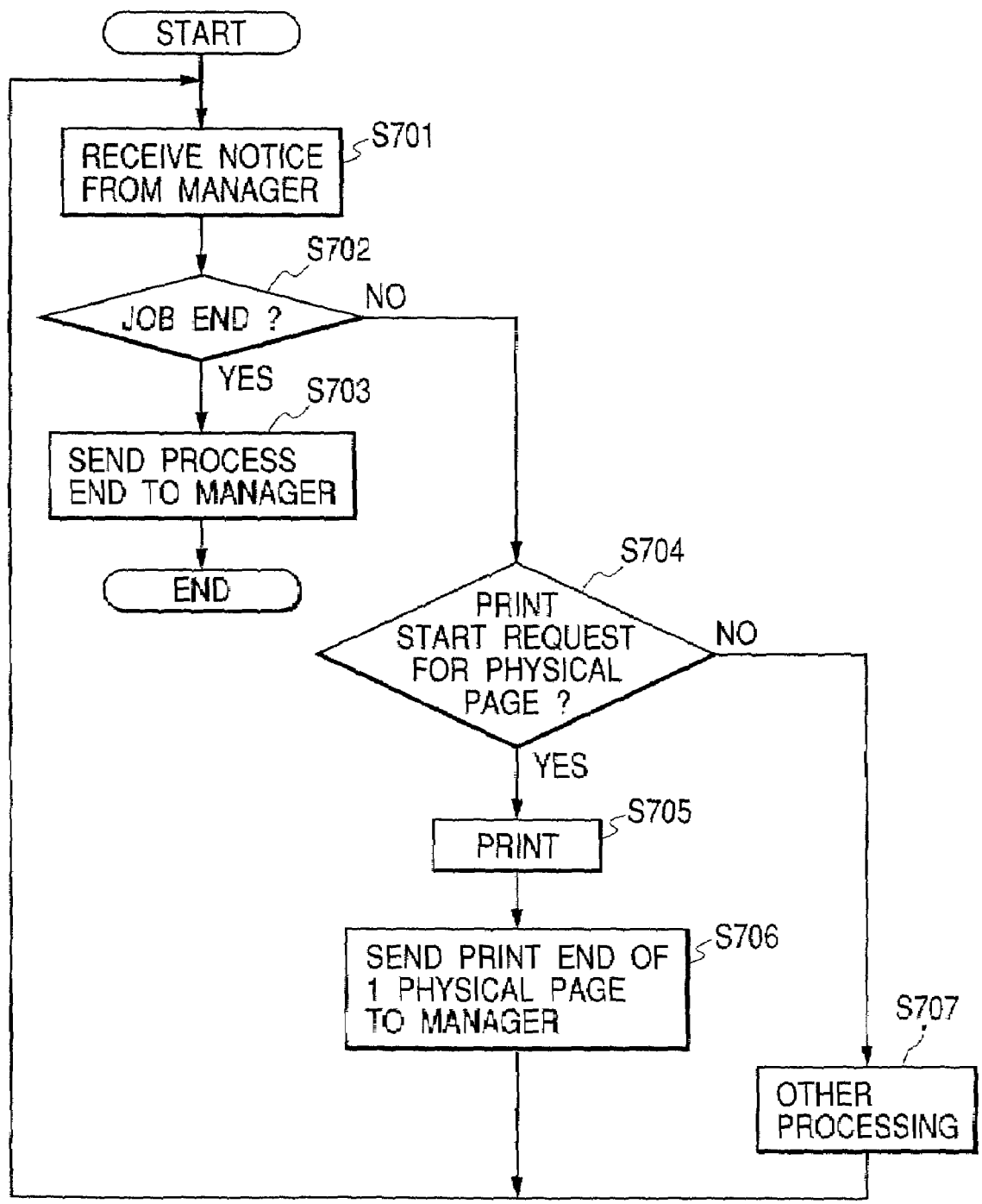
FIG. 9 is a flowchart for explaining the operation of a despooler of the host computer.

FIG. 9 is a flowchart showing the generating process of the print data in the despooler 235 shown in FIG. 3.

In response to the print request from the spool file manager 234, the despooler 235 reads out necessary information from the spool file 233 and generates the print data. Since a method of transferring the generated print data to the printer 300 is as described above with reference to FIG. 3, its detailed description is omitted here.

Step S701:

The despooler 235 receives the notice from the spool file manager 234.

Step S702:

The despooler 235 discriminates whether the notice in step S701 is a job end notice or not.

In case of the job end notice as a result of the discrimination, next step S703 follows. If NO, the processing routine advances to step S704, which will be explained hereinlater.

Step S703:

In case of the job end notice as a result of the discrimination in step S702, the despooler 235 notifies the spool file manager 234 of the end of the process in the despooler 235. After that, the processing routine is finished.

Step S704:

As a result of the discrimination in step S702, if the notice is not the job end notice, the despooler 235 discriminates whether the notice in step S701 is a print start request notice of the physical page notified by the spool file manager 234 in step S608 in FIG. 7 or not.

In case of the print start request notice of the physical page as a result of the discrimination, next step S705 follows. If NO, the processing routine advances to step S707, which will be explained hereinlater.

Step S705:

In case of the print start request notice of the physical page as a result of the discrimination in step S704, the despooler 235 obtains information necessary for generation of the print data of the designated physical page from the information (refer to FIG. 8 mentioned above) shown by the notice from the spool file manager 234 and the information in the spool file 233 and executes the printing process on the basis of the obtained information.

Specifically speaking, the despooler 235 converts the print request command stored in the spool file 233 into a format (GDI function) which can be recognized by the graphic engine 222 of the OS and transfers it. At this time, if there is a print setting of a page layout such that a plurality of logical pages are arranged to one physical page, the above conversion is performed in consideration of a reduction layout. Specifically speaking, if "N pages/sheet" has been designated as a page layout, a printable area of the output paper size as a physical page is calculated in accordance with a print margin. The obtained printable area is divided into N equal areas. The data as a print target stored in the spool file 233 in the intermediate data format is reduced so that each logical data of N pages can be enclosed in the divided area. The reduced print target data is arranged (layout) in the designated layout order. A converting and generating process of a drawing function is executed so as to obtain the print result. If "auto layout of the designated size" has been designated as a page layout, as will be explained hereinlater, the print target data stored in the spool file 233 in the intermediate data format is arranged (layout) so as to be enclosed in the output paper size as a physical page without being reduced. The converting and generating process of the drawing function is executed so as to obtain the print result.

Step S706:

After completion of the printing process in step S705, the despooler 235 notifies the spool file manager 234 of the end of the generation of the print data of one physical page.

After that, the processing routine is returned to step S701 and the subsequent processing steps are repetitively executed.

Step S707:

As a result of the discrimination in step S704, if the notice is not the print start request of the physical page, the despooler 235 executes the process corresponding to the notice in step S701.

After that, the processing routine is returned to step S701 and the subsequent processing steps are repetitively executed.

<Characteristic Functions of Printer Control System 100>

An explanation will now be made with respect to a construction such that in the printer control system 100 as mentioned above, for example, in case of printing a plurality of pages in the user-defined size, the page number is also drawn on the reverse side in consideration of a page frame (cutting) and, further, the page frame is drawn only on the reverse side.

Each of various picture planes 1000 to 1500, which will be explained hereinlater, is constructed so as to be displayed on the CRT display 210 of the host computer 200 by the control of the CPU 201.

Figure 10:
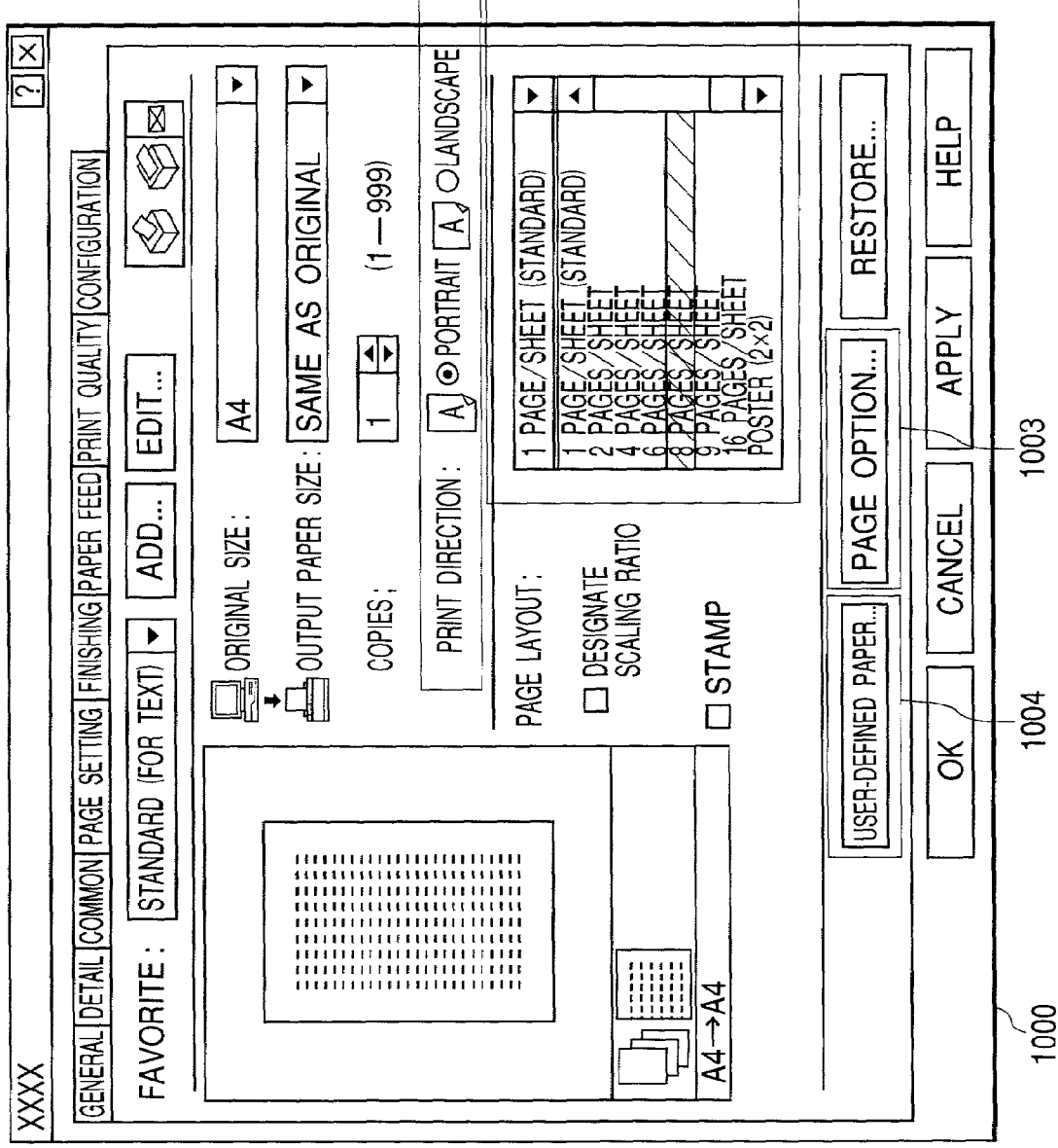
FIG. 10 is a schematic diagram for explaining an example of a setting picture plane of a plural-page printing in the host computer.

FIG. 10 shows an example of the setting picture plane 1000 for a plural page printing process.

The setting picture plane 1000 is constructed so that the plural page printing process can be set from the page layout list 1001.

The setting picture plane 1000 includes: an item 1002 for setting the paper direction; a button 1003 for setting the page frame; and a button 1004 for setting the user-defined size. It is also possible to designate an original size as a paper size of the print target data (logical page) which is inputted from the application of the setting picture plane (user interface for print setting which is provided by the printer driver) 1000 and the output paper size as a paper size of the recording paper (physical page) to be printed and outputted.

Figure 11:
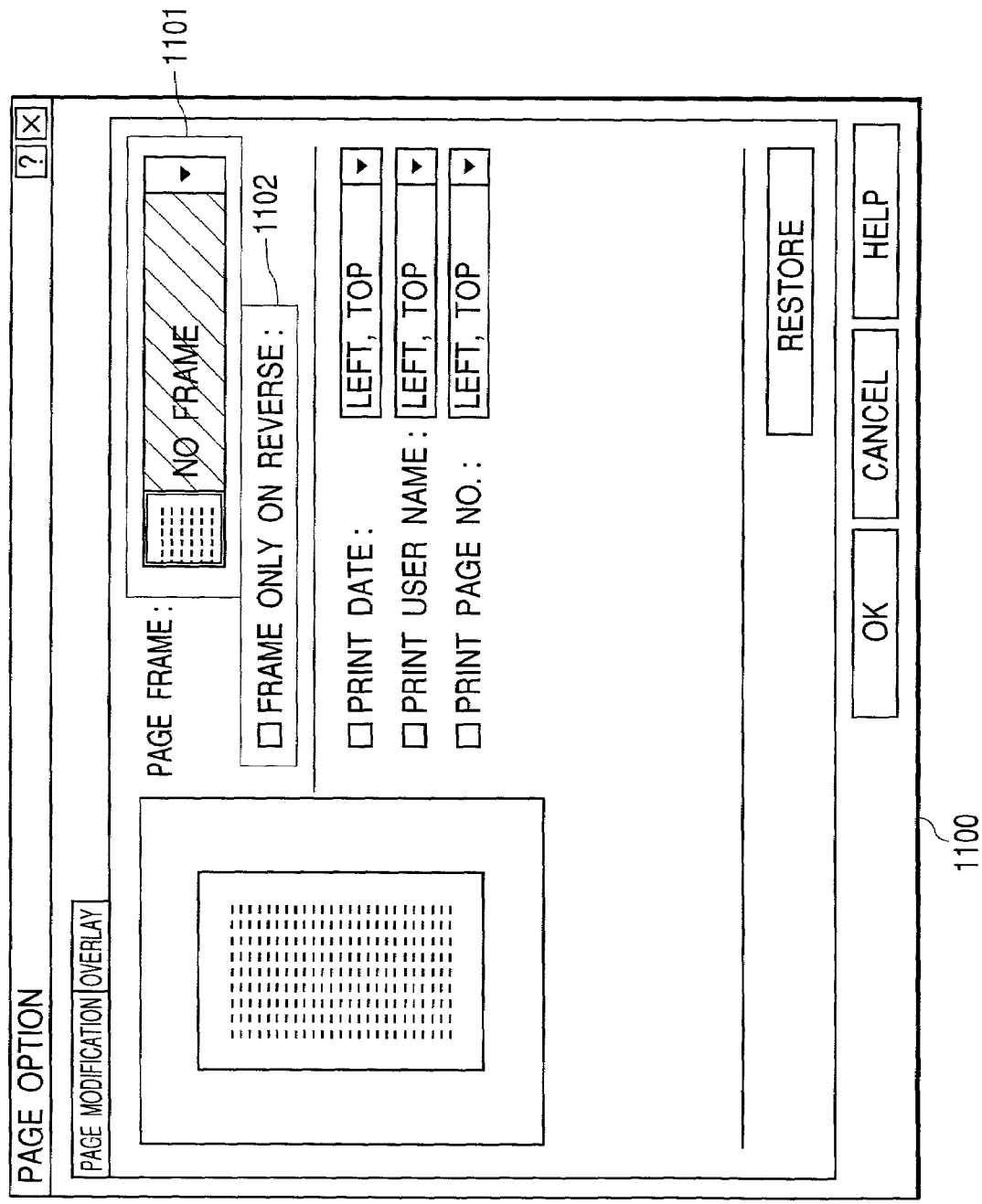
FIG. 11 is a schematic diagram for explaining an example of a page frame setting picture plane in the host computer.

FIG. 11 shows an example of a page frame setting picture plane 1100 which is switched when the button 1003 on the setting picture plane 1000 of FIG. 10 is depressed.

The page frame setting picture plane 1100 includes: an item 1101 for setting a kind of frame line; and an item 1102 for designating whether the frame line is added to the reverse side or not. The setting by the item 1102 can be performed when the duplex printing mode has been designated.

Figure 12:
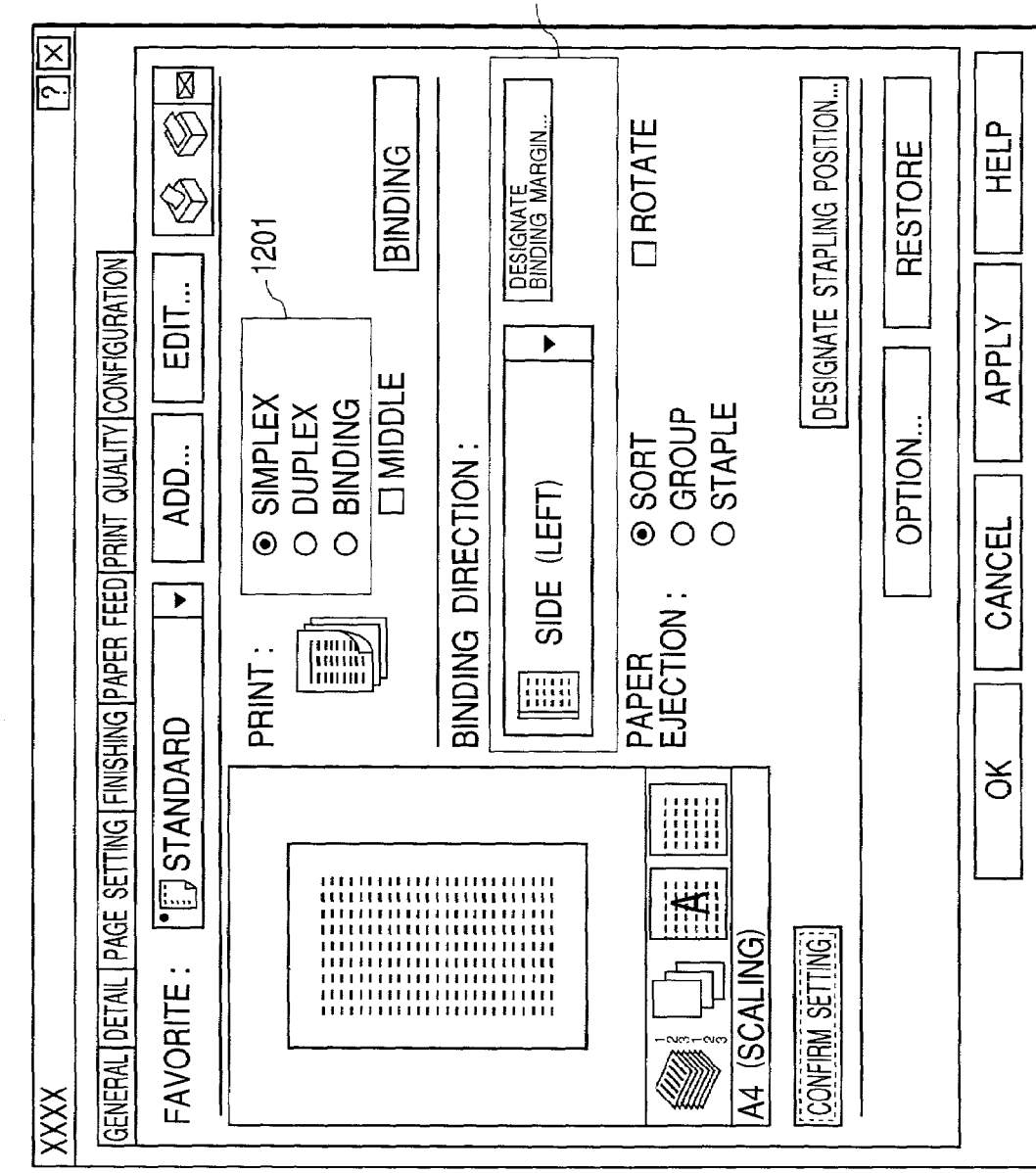
FIG. 12 is a schematic diagram for explaining an example of a duplex printing setting picture plane in the host computer.

FIG. 12 shows an example of a setting picture plane 1200 for setting the duplex printing process.

The setting picture plane 1200 includes: an item 1201 for setting the duplex printing process; and an item 1202 for designating a binding position and a binding margin.

Figure 13:
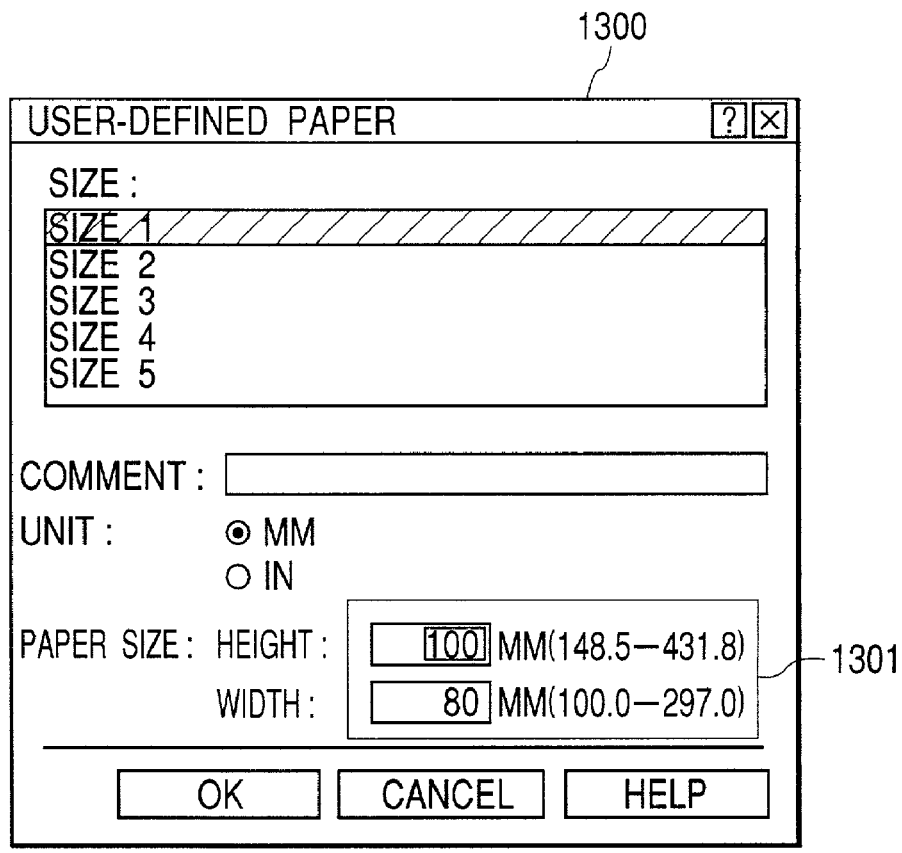
FIG. 13 is a schematic diagram for explaining an example of a user-defined paper size designation dialog picture plane in the host computer.

FIG. 13 shows an example of a user-defined paper size designation dialog picture plane 1300 which is switched when the button 1004 on the setting picture plane 1000 of FIG. 10 is depressed.

The user-defined paper size designation dialog picture plane 1300 includes an item 1301 for designating a desired output paper size (first output paper size) of the user. Information such as a range of the paper size (second output paper size) supported by the printer 300 or the like is written in the right portion of the item 1301.

Figure 14:
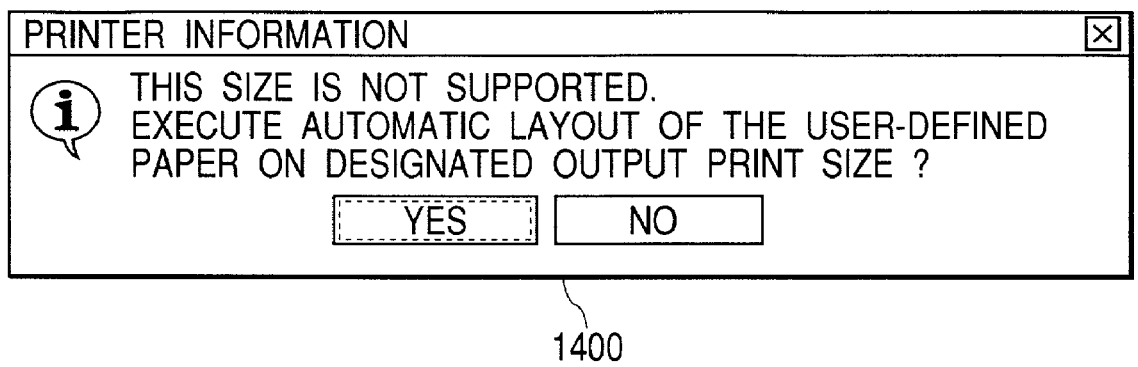
FIG. 14 is a schematic diagram for explaining an example of a message picture plane in the host computer.

For example, on the picture plane shown in each of FIGS. 10, 11, 12 and 13, if the user designates the user-defined size for the output paper size which is not supported by the printer 300 like a system notebook or the like, a message picture plane 1400 as shown in FIG. 14 is displayed.

When "YES" is selected on the message picture plane 1400, the auto layout process in the embodiment as will be explained hereinlater is executed. If "NO" is selected, a present input value is invalidated.

Figure 15:
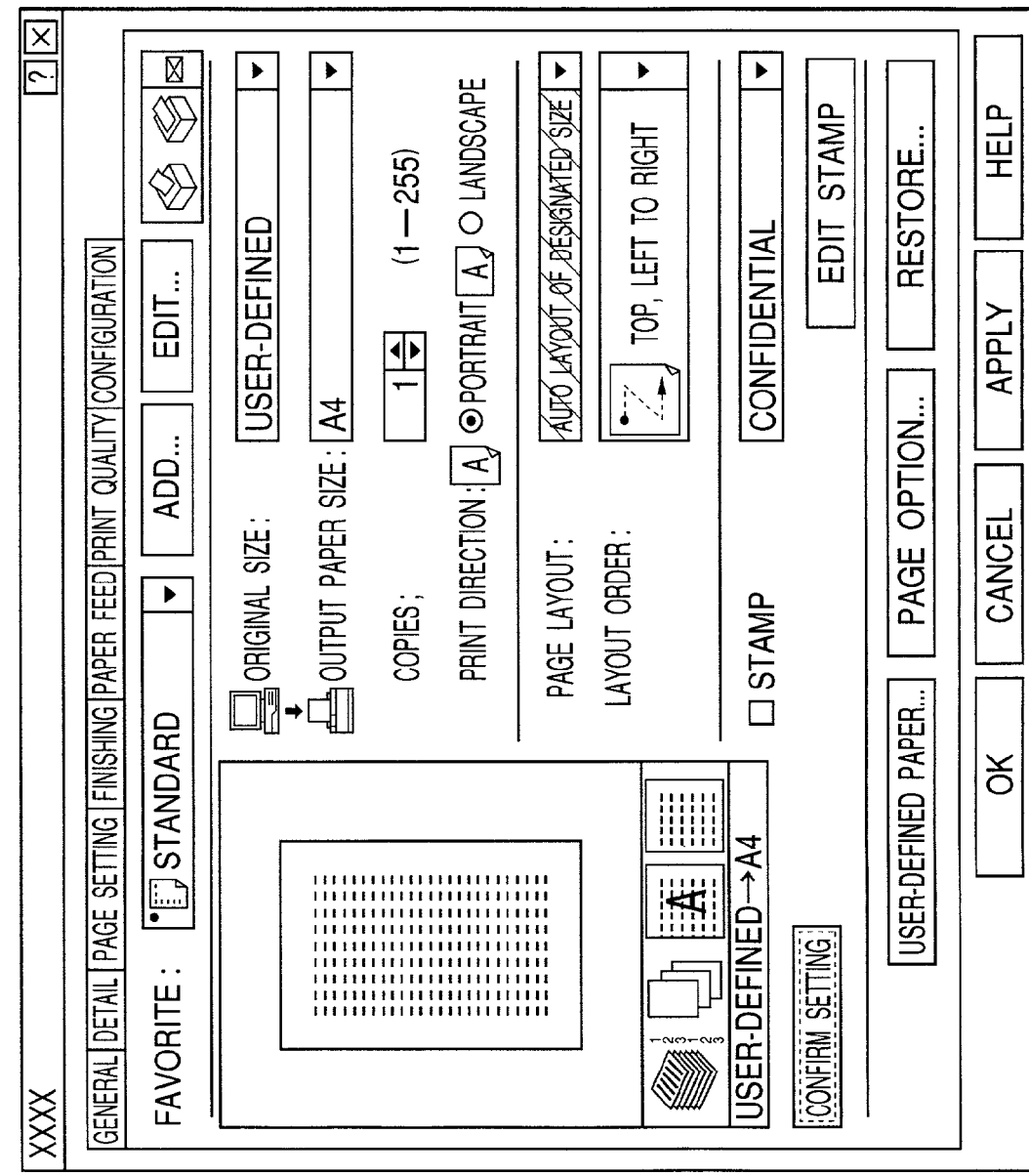
FIG. 15 is a schematic diagram for explaining an example of a printer driver GUI picture plane in the host computer.

FIG. 15 shows an example of the GUI picture plane 1500 for the auto layout process which is provided by the printer driver 223 in the embodiment.

On the GUI picture plane 1500, a state where the "auto layout of the designated size" has been selected as a page layout is shown. The layout order is validated in a manner similar to the plural page (N pages) printing process (N-up process for reducing N logical pages and arranging them to one physical page).

The user interface for the print setting which is provided by the print control program (corresponding to the printer driver 223) of the information processing apparatus of the invention has a function of designating means for designating the N-up printing process and designating the layout process for arranging the non-reduced N logical pages to one physical page, as a page layout.

Figure 16:
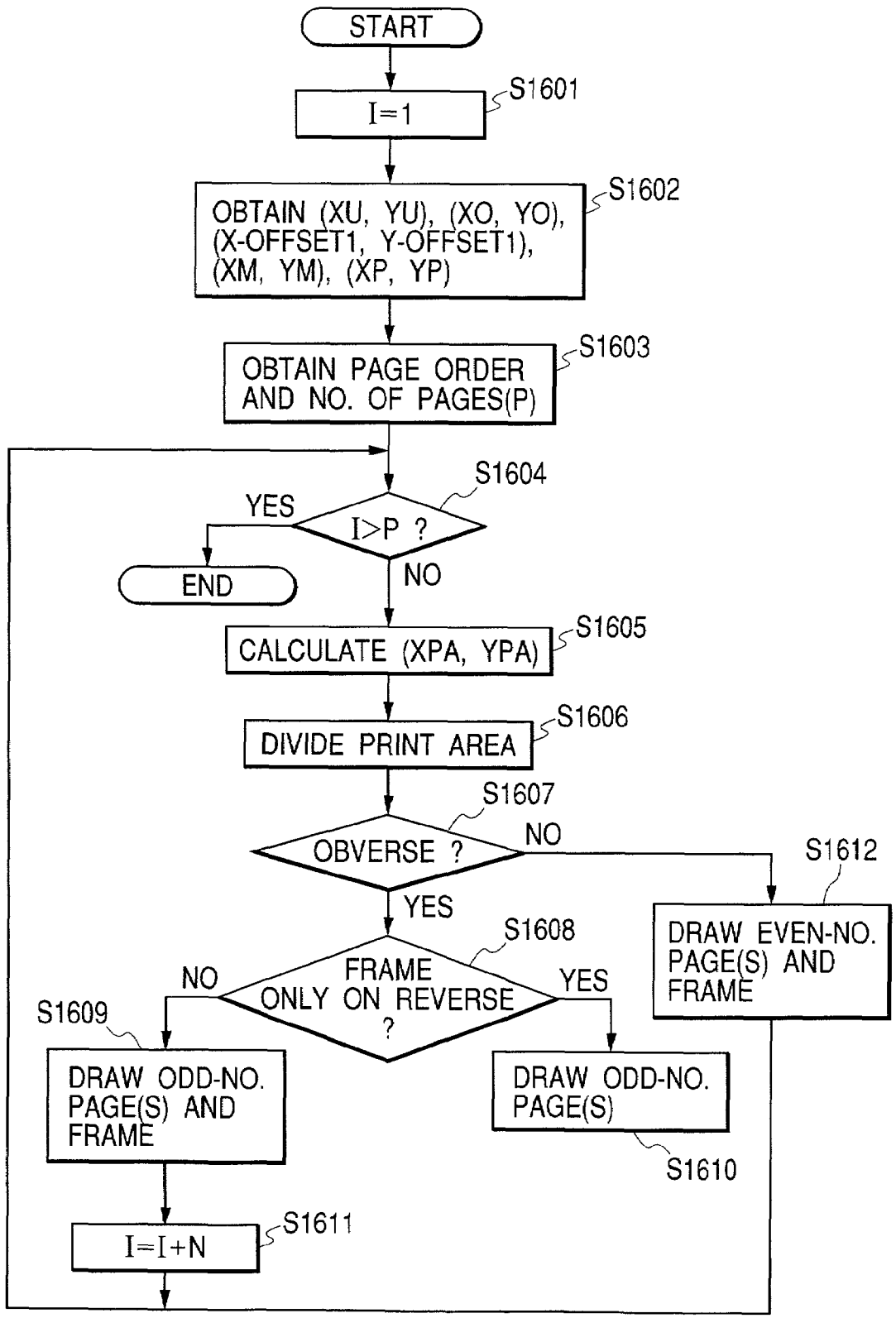
FIG. 16 is a flowchart for explaining an automatic layout process in the host computer.

FIG. 16 is a flowchart showing the auto layout process in the embodiment. The auto layout process is executed by the CPU 201 (printer driver 223 or the like) in the case where the "auto layout of the designated size" has been designated as a page layout.

Although the present process itself is executed by the CPU, the processing program is provided by the printer driver 223, is loaded into the RAM, and can be executed.

Step S1601:
The CPU 201 initializes a counter I to "1".

Step S1602
The CPU 201 obtains information regarding the user-defined size (XU, YU) designated and inputted by the user, the output paper size (XO, YO) in which the printer 300 can draw, offsets (X-OFFSET1, Y-OFFSET1) at the left edge and upper edge for the paper, a binding position, a binding margin (XM, YM) and an effective print area (XP, YP).

Figure 17:
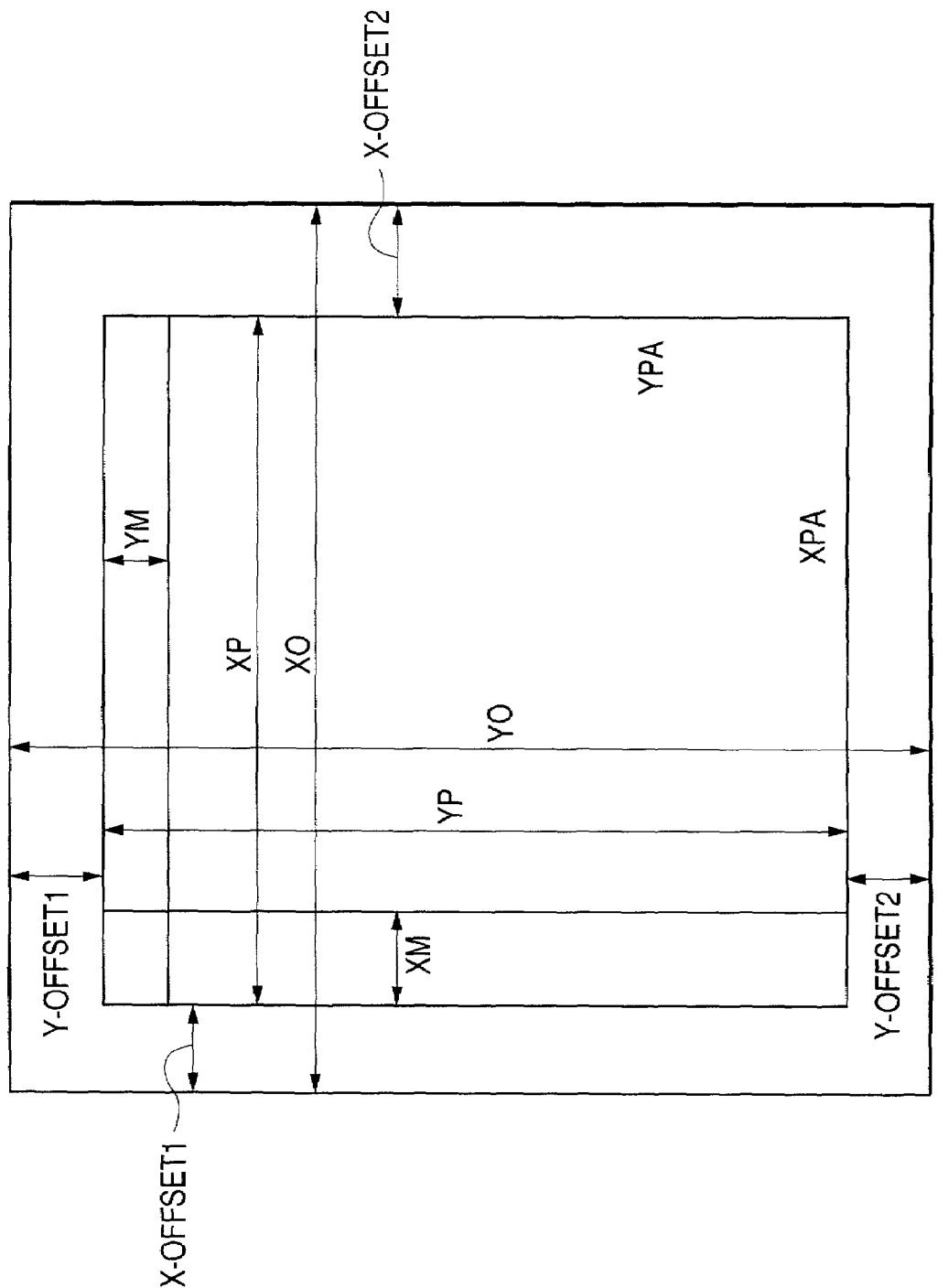
FIG. 17 is a schematic diagram for explaining a positional relation of variables onto a paper in the automatic layout process.

FIG. 17 shows the various information (variables) obtained here.

Offsets (X-OFFSET2, Y-OFFSET2) at the right edge and lower edge for the paper are obtained by the following equations on the basis of the various information.

$$X\text{-OFFSET2}=XO-(XP+X\text{-OFFSET1})$$

$$Y\text{-OFFSET2}=YO-(YP+Y\text{-OFFSET1})$$

Step S1603:
The CPU 201 obtains the page print order in the auto layout and the number P of pages.

Step S1604:
The CPU 201 discriminates whether the printing process has been finished or not (whether I>P or not) by comparing the count value of the counter I with the number P of pages.

If the printing process has been finished as a result of the discrimination, the processing routine is finished. If NO, next step S1605 follows.

Step S1605:
If the printing process is not finished yet as a result of the discrimination in step S1604, the CPU 201 obtains the effective print area (XPA, YPA) on the paper by the following equations.

$$XPA=XP-(XM+|X\text{-OFFSET1}-X\text{-OFFSET2}|)$$

$$YPA=YP-(YM+|Y\text{-OFFSET1}-Y\text{-OFFSET2}|)$$

In those equations, "| |" indicates an absolute value.

The binding positions of the obverse and reverse sides are opposite.

Step S1606:
The CPU 201 executes a dividing process for arranging the user-defined size (XU, YU) into the effective print area (XPA, YPA) obtained in step S1605.

Specifically speaking, how many pages of the user-defined size (XU, YU) can be arranged, respectively, in each of the X and Y directions in the effective print area (XPA, YPA) is obtained by the following arithmetic operations.

The number NX of pages which can be arranged in the X direction . . . NX=XPA/XU

The number NY of pages which can be arranged in the Y direction . . . NY=YPA/YU

In those arithmetic operations, the figure below a decimal point is omitted.

Therefore, the actual print area becomes (XU×NX, YU×NY). The number N of logical pages which are drawn in the relevant page is equal to $$N=NX\times NY$$

Step S1607:
The CPU 201 discriminates whether the processing target page is the obverse side or the reverse side.

In case of the obverse side as a result of the discrimination, step S1608 follows. In case of the reverse, step S1612 follows.

Step S1608:
Whether a frame line is added to the reverse side or not is discriminated on the basis of the set value of the item 1102 on the page frame setting picture plane 1100 in FIG. 11. If NO as a result of the discrimination, step S1609 follows. If YES, step S1610 follows.

Step S1609:
If the frame line is added to each of the reverse side and the obverse side as a result of the discrimination in step S1608, the CPU 201 instructs the operation to the printer 300 so as to draw odd-number logical page data into each layout area (divisional area) on the obverse side, draw a frame in accordance with a drawing setting of the frame, and further, draw a frame line so as to show the paper size.

Step S1610:
As a result of the discrimination in step S1608, if the frame line is added to the reverse side, that is, if the frame line is added only to the reverse side, the CPU 201 instructs the operation to the printer 300 so as to draw the odd-number logical page data into each layout area (divisional area) on the obverse side.

Step S1612:
In case of the reverse side as a result of the discrimination in step S1607, the CPU 201 instructs the operation to the printer 300 so as to draw the even-number logical page data into each layout area (divisional area) on the reverse side, draw a frame in accordance with the drawing setting of the frame, and further, draw a frame line so as to show the paper size.

Step S1611:
The CPU 201 increases the count value of the counter I by "N".

FIGS. 18A, 18B, 18C, 18D and 18E are tables of an example in the case where in the drawing process in step S1609 in FIG. 16, for instance, the print order of the auto layout and how the logical pages are arranged and drawn in the paper orientation in case of drawing the print data onto the reverse side are shown.

In FIGS. 18A, 18B, 18C, 18D and 18E, "LRTB" indicates "Left", "Right", "Top" and "Bottom", respectively, "LR" indicates "from left to right", and "TB" indicates "from top to bottom". Therefore, "LRTB" denotes that the logical pages are arranged and drawn from the top left position to the right. "RLTB" denotes that the logical pages are arranged and drawn from the top right position to the left. "TBLR" denotes that the logical pages are arranged and drawn from the top left position downwardly. "TBRL" denotes that the logical pages are arranged and drawn from the top right position downwardly.

In case of drawing the print data onto the obverse side, it is sufficient that the odd-number pages are arranged and drawn in print order in step S1608.

As mentioned above, the auto layout process of the user-defined size is executed. Thus, since the user-defined sizes as many as a plurality of pages can be arranged and the printing process can be performed, an allowable range of the user-defined size is widened.

Second Embodiment

The first embodiment has been described with respect to the example of drawing the frame line only to the reverse side in the duplex printing mode of drawing the page data onto the obverse and reverse sides.

In the second embodiment, an example of drawing the frame line only to the reverse side in the simplex printing mode of drawing the page data only onto the obverse side will be explained.

Figure 19:
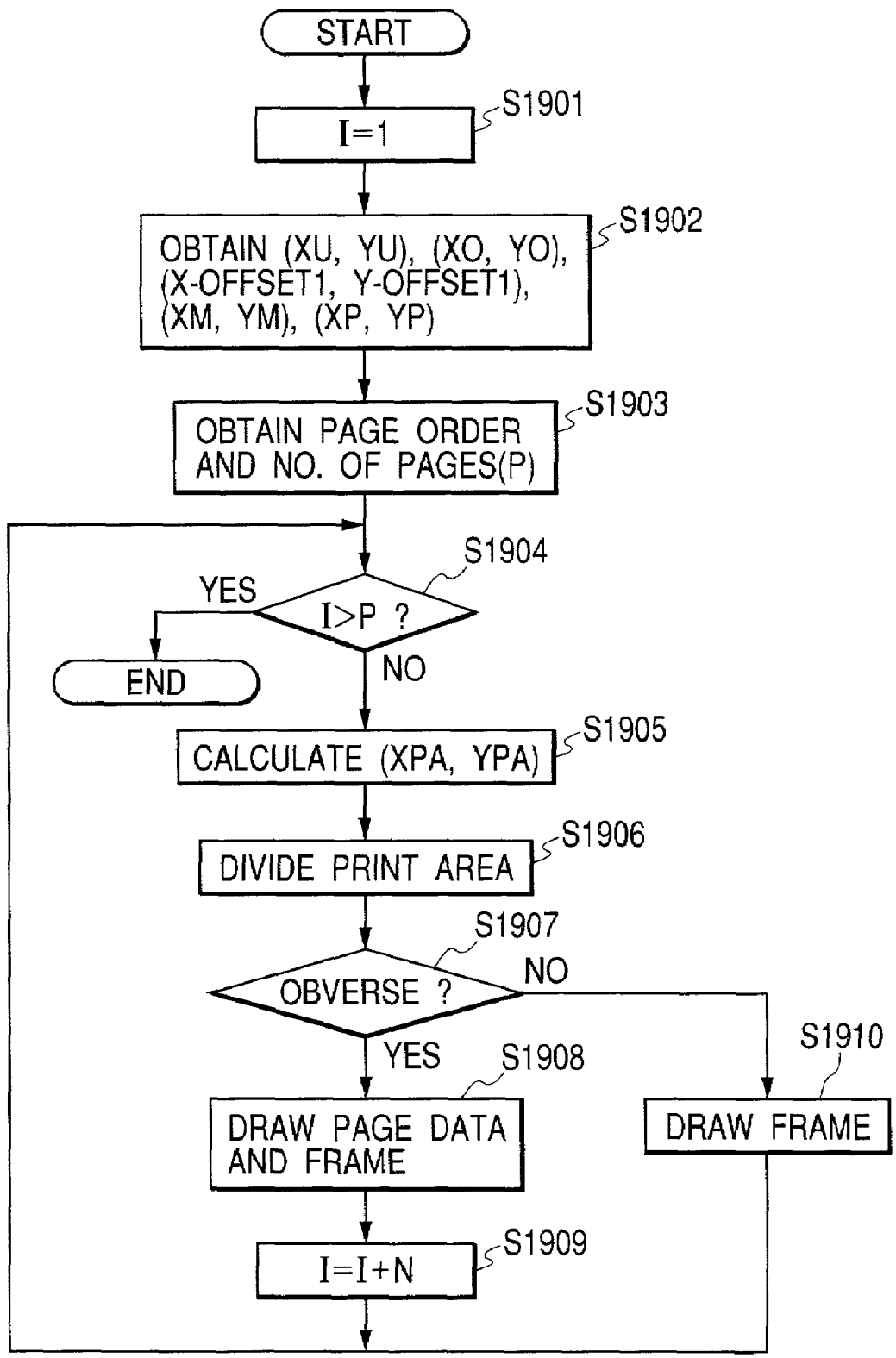
FIG. 19 is a flowchart for explaining the automatic layout process in the host computer according to the second embodiment.

FIG. 19 is a flowchart for explaining the auto layout process by the host computer in the second embodiment.

The auto layout process is executed by the CPU 201 (printer driver 223 or the like) in the case where "auto layout of the designated size" has been designated as a page layout.

Although the present process itself is executed by the CPU, the processing program is provided by the printer driver 223, is loaded into the RAM, and can be executed.

Step S1901:
The CPU 201 initializes the count value of the counter I to "1".

Step S1902:
The CPU 201 obtains the information regarding the user-defined size (XU, YU) designated and inputted from the user, the output paper size (XO, YO) at which the printer 300 can draw, the offsets (X-OFFSET1, Y-OFFSET1) at the left edge and upper edge for the paper, the binding position and the binding margin (XM, YM), and the effective print area (XP, YP). Those variables are the same as those described in FIG. 17.

Step S1903:
The CPU 201 obtains the page print order and the number P of pages in the auto layout.

Step S1904:
The CPU 201 discriminates whether the printing process has been finished or not (whether I>P or not) by comparing the count value of the counter I with the number P of pages.

If the printing process has been finished as a result of the discrimination, the processing routine is finished. If NO, next step S1905 follows.

Step S1905:
If the printing process is not finished yet as a result of the discrimination in step S1904, the CPU 201 obtains the effective print area (XPA, YPA) on the paper by equations similar to those in step S1605.

Step S1906:
The CPU 201 executes the dividing process for arranging the user-defined size (XU, YU) for the effective print area (XPA, YPA) obtained in step S1905. How many pages of the user-defined size (XU, YU) can be arranged in each of the X and Y directions in the effective print area (XPA, YPA) is obtained by a method similar to that in step S1606.

Step S1907:
The CPU 201 discriminates whether the processing target page is the obverse side or the reverse side.

In case of the obverse side as a result of the discrimination, step S1908 follows. In case of the reverse, step S1910 follows.

Step S1908:
In case of the obverse side as a result of the discrimination in step S1907, the CPU 201 instructs the printer 300 to operate so as to draw logical page data into each layout area (divisional area) on the obverse side, draw a frame in accordance with a drawing setting of the frame, and further, draw a frame line so as to show the paper size.

Step S1909:
The CPU 201 increases the count value of the counter I by "N".

Step S1910:
In case of the reverse side as a result of the discrimination in step S 1907, the CPU 201 instructs the operation to the printer 300 so as to draw a frame onto the reverse side in accordance with the drawing setting of the frame, and further, draw a frame line so as to show the paper size.

Since the frame line is drawn only onto the reverse side by the above processes, the frame line as a cutting line can be efficiently drawn.

The invention can be applied to a system comprising a plurality of apparatuses (for example, a host computer, an interface device, a reader, a printer and the like) or to an apparatus (a copying machine, a printer, a facsimile apparatus, or the like) comprising one piece of equipment.

Naturally, the objects of the invention is accomplished also by a method whereby a memory medium in which program codes of software for realizing the functions of the host and terminal in the first embodiment have been stored is supplied to a system or an apparatus and a computer (or a CPU or an MPU) of the system or apparatus reads out and executes the program codes stored in the memory medium.

In this case, the program codes themselves read out from the memory medium realize the functions of the first embodiment. The memory medium in which the program codes have been stored constructs the invention.

As a memory medium for supplying the program codes, it is possible to use an ROM, a floppy disk, a hard disk, an optical disk, a magnetooptic disk, a CD-ROM, a CD-R, a CD-RW, a magnetic tape, a non-volatile memory card, a DVD-ROM, a DVD-RAM, or the like.

Naturally, the invention incorporates not only a case where a computer executes the read-out program codes, so that the functions of the first embodiment are realized but also a case where on the basis of instructions of the program codes, an OS or the like which is operating on the computer executes a part or all of the actual processes and the functions of the first embodiment are realized by those processes.

Further, the invention also incorporates a case where the program codes read out from the memory medium are written into a memory provided for a function expanding board inserted into a computer or a function expanding unit connected to a computer, after that, a CPU or the like equipped for the function expanding board or function expanding unit executes a part or all of the actual processes on the basis of instructions of the program codes, and the functions of the first embodiment are realized by those processes.

According to the invention as described above, on the basis of a predetermined second output paper size and an arbitrary first output paper size included in the second output paper size, a plurality of pages of the first output paper size are arranged to one page of the second output paper size. At this time, the above layout can be also made to both of the obverse and reverse sides. The frame line can be also added.

By the above construction, a desired printing process can be easily performed irrespective of the restriction of the output paper size which can be defined by the user. It is also possible to effectively add the frame line (page frame) and execute the printing process.

For example, like a system notebook or the like, the printing process in an arbitrary size (first output paper size) which is not supported by the printer can be also easily executed. The cutting line can be also effectively added by the construction of adding the frame line.

What is claimed is:

1. An information processing apparatus for controlling a printing operation in a printer which can perform a duplex printing, comprising:
   first input means for inputting an arbitrary first output paper size;
   second input means for inputting a second output paper size including the first output paper size;
   data input means for inputting drawing data for a plurality of pages to be printed;
   arrangement layout means for arranging the drawing data for the plurality of pages, input by said data input means, according to the first output paper sizes with respect to a paper of the second output paper size on the basis of the first output paper size and the second output paper size; and
   designating means for designating whether said arrangement layout means adds a frame line to only a reverse side of the paper of the second output paper size,
   wherein said arrangement layout means adds the frame line to only the reverse side of the paper of the second output paper size without adding a frame line to a front side of the paper of the second output paper size in a case where said designating means designates that said arrangement layout means adds the frame line to only the reverse side of the paper of the second output paper size.

2. An apparatus according to claim 1, wherein the first output paper size is a paper size of print target data in a logical page which is inputted from an application, and the second output paper size is a paper size of a recording paper in a physical page which is printed and outputted.

3. An apparatus according to claim 1, wherein the first output paper size is a user-defined paper size and the second output paper size is a regular paper size.

4. An apparatus according to claim 1, wherein said arrangement layout means arranges the plurality of pages of the first output paper size to one page of the second output paper size without reducing said plurality of pages.

5. An apparatus according to claim 1, further comprising second layout means for zooming print target data of the first output paper size to the second output paper size, reducing N pages (N is equal to 2 or more) of the zoomed print target data, and arranging the reduced print target data of N pages.

6. An apparatus according to claim 5, further comprising second designating means for designating whether the layout in said second layout means is executed or the layout in said arrangement layout means is executed.

7. A print processing method of controlling a printing operation in a printer which can perform a duplex printing in a system including an information processing apparatus connected to said printer, comprising:
   a first input step of inputting a first output paper size which is desired by a user in the information processing apparatus;
   a second input step of inputting a second output paper size including the first output paper size in the information processing apparatus;
   data input step for inputting drawing data for a plurality of pages to be printed;
   a layout step of arranging the drawing data for the plurality of pages, input by said data input step, according to the first output paper sizes with respect to a paper of the second output paper size on the basis of the first output paper size inputted by the first input step and the second output paper size inputted by the second input step; and
   a designating step of designating whether said layout step adds a frame line to only a reverse side of the paper of the second output paper size,
   wherein said layout step adds the frame line to only the reverse of the paper of the second output paper size without adding the frame line to a front side of the paper of the second output paper size in a case where said designating step designates that said layout step adds of a frame line to only the reverse side of the paper of the second output paper size.

8. A method according to claim 7, wherein said layout step includes a step of adding a frame line to an obverse and a reverse of the paper of the second output paper size.

9. A computer program embodied on a computer-readable medium and which is executed by a computer for controlling a printing operation in a printer which can perform a duplex printing, comprising:
   a first input step of inputting a first output paper size which is desired by a user in the information processing apparatus;
   a second input step of inputting a second output paper size including the first output paper size in said information processing apparatus;
   data input step for inputting drawing data for a plurality of panes to be printed;
   a layout step of arranging the drawing data for the plurality of pages, input by said data input step, according to the first output paper sizes with respect to a paper of the second output paper size on the basis of the first output paper size inputted by the first input step and the second output paper size inputted by the second input step; and
   a designating step of designating whether said layout step adds a frame line to only a reverse side of the paper of the second output paper size,
   wherein said layout step adds the frame line only to only the reverse side of the paper of the second output paper size without adding the frame line to a front side of the paper of the second output paper size in a case where said designating step designates that said layout step adds a frame line to only the reverse side of the paper of the second output paper size.

10. A computer program embodied on a computer-readable medium according to claim 9, wherein said layout step includes a step of adding a frame line to an obverse and a reverse of the paper of said second output paper size.

11. A computer-readable memory medium which stores a computer program according to claim 9.

12. An information processing apparatus for controlling a printing operation in a printer which can perform a duplex printing, comprising:

size input means for inputting an output paper size;

data input means for inputting drawing data for a plurality of pages to be printed;

layout input means for inputting a page layout which indicates the number of pages to be arranged on a single face of a paper;

arrangement layout means for arranging a plurality of pages of the drawing data input by said data input means with respect to a paper of the output paper size, input by said size input means, on the basis of the page layout input by said layout input means; and designating means for designating whether said arrangement layout means adds a frame line to only a reverse side of the paper of the output paper size, wherein said arrangement layout means adds the frame line to only the reverse side of the paper of the output paper size without adding the frame line to a front side of the paper of the output paper size in a case where said designating means designates that said arrangement layout means adds a frame line to only a reverse side of the paper of the output paper size.

13. A print processing method of controlling a printing operation in a printer which can perform a duplex printing, comprising:

a size input step for inputting an output paper size;

a data input step for inputting drawing data for a plurality of pages to be printed;

a layout input step for inputting a page layout which indicates the number of pages to be arranged on a single face of a paper;

an arrangement layout step for arranging a plurality of pages of the drawing data input by said data input step with respect to a paper of the output paper size, input by said size input step, on the basis of the page layout input by said layout input step; and a designating step for designating whether said arrangement layout step adds a frame line to only a reverse side of the paper of the output paper size, wherein said arrangement layout step adds the frame line to only the reverse side of the paper of the output paper size without adding the frame line to a front side of the paper of the output paper size in a case where said designating step designates that said arrangement layout step adds a frame line to only a reverse side of the paper of the output paper size.

14. A computer program embodied on a computer-readable medium and which is executed by a computer for controlling a printing operation in a printer which can perform a duplex printing, comprising:

a size input step for inputting an output paper size;

a data input step for inputting drawing data for a plurality of pages to be printed;

a layout input step for inputting a page layout which indicates the number of pages to be arranged on a single face of a paper;

an arrangement layout step for arranging a plurality of pages of the drawing data input by said data input step with respect to a paper of the output paper size, input by said size input step, on the basis of the page layout input by said layout input step; and a designating step for designating whether said arrangement layout step adds a frame line to only a reverse side of the paper of the output paper size, wherein said arrangement layout step adds the frame line to only the reverse side of the paper of the output paper size without adding the frame line to a front side of the paper of the output paper size in a case where said designating step designates that said arrangement layout step adds a frame line to only a reverse side of the paper of the output paper size.

\* \* \* \* \*

UNITED STATES PATENT AND TRADEMARK OFFICE
CERTIFICATE OF CORRECTION

| | |
|---|---|
| PATENT NO. | : 7,142,327 B2 |
| APPLICATION NO. | : 09/986794 |
| DATED | : November 28, 2006 |
| INVENTOR(S) | : Yasuhiro Kujirai |

It is certified that error appears in the above-identified patent and that said Letters Patent is hereby corrected as shown below:

COLUMN 4:
Line 50, "203a,the" should read --203a, the--.
Line 51, "203b,and" should read --203b, and--.
Line 64, "203b,the" should read --203b, the--.
Line 65, "203a,the" should read --203a, the--.
Line 66, "203c,and" should read --203c, and--.

COLUMN 5:
Line 31, "303a,the" should read --303a, the--.

COLUMN 6:
Line 4, "NVRAM" should read --NVRAM (not shown)--.

COLUMN 7:
Line 6, "FIG. 2,the" should read --FIG. 2, the--.

COLUMN 8:
Line 64, "motor 31 a" should read --motor 31a--.

COLUMN 9:
Line 38, "300 μ m." should read --300 μm.--.

COLUMN 10:
Line 8, "be" (first occurrence) should be deleted.
Line 29, "be" should be deleted.

COLUMN 17:
Line 23, "Step S1602" should read --Step S1602:--.

COLUMN 18:
Line 33, "50" should read --so--.

COLUMN 20:
Line 24, "step S 1907," should read --step S1907,--.
Line 36, "is" should read --are--.

UNITED STATES PATENT AND TRADEMARK OFFICE
CERTIFICATE OF CORRECTION

PATENT NO. : 7,142,327 B2  
APPLICATION NO. : 09/986794  
DATED : November 28, 2006  
INVENTOR(S) : Yasuhiro Kujirai It is certified that error appears in the above-identified patent and that said Letters Patent is hereby corrected as shown below:

COLUMN 22:  
Line 30, "of" (first occurrence) should be deleted.  
Line 46, "panes" should read --pages--.  
Line 57, "only" (first occurrence) should be deleted.

Signed and Sealed this

Twenty-fifth Day of March, 2008

JON W. DUDAS  
*Director of the United States Patent and Trademark Office*